(12) United States Patent
Pearson et al.

(10) Patent No.: US 11,069,145 B1
(45) Date of Patent: Jul. 20, 2021

(54) AUGMENTED REALITY APPLICATION FOR INTERACTING WITH BUILDING MODELS

(71) Applicant: CoreLogic Solutions, LLC, Irvine, CA (US)

(72) Inventors: Neil Pearson, Ottawa (CA); Patrick Jacolenne, Perris, CA (US)

(73) Assignee: CoreLogic Solutions, LLC, Irvine, CA (US)

( * ) Notice: Subject to any disclaimer, the term of this patent is extended or adjusted under 35 U.S.C. 154(b) by 0 days.

(21) Appl. No.: 16/596,616

(22) Filed: Oct. 8, 2019

Related U.S. Application Data

(60) Provisional application No. 62/743,450, filed on Oct. 9, 2018.

(51) Int. Cl.
*G06T 19/00* (2011.01)
*G06T 19/20* (2011.01)

(52) U.S. Cl.
CPC ............ *G06T 19/006* (2013.01); *G06T 19/20* (2013.01); *G06T 2210/04* (2013.01); *G06T 2219/2016* (2013.01)

(58) Field of Classification Search
None
See application file for complete search history.

(56) References Cited

U.S. PATENT DOCUMENTS

| 9,530,250 B2 * | 12/2016 | Mazula | G06F 30/13 |
| 10,579,749 B1 * | 3/2020 | Davis | G06F 30/20 |
| 2019/0005719 A1 * | 1/2019 | Fleischman | G06T 7/73 |

OTHER PUBLICATIONS

Polat et al., "DEM generation with UAV Photogrammetry and Accuracy analysis in Sahitler Hill". Elsevier. 2015. (Year: 2015).*

* cited by examiner

*Primary Examiner* — Nicholas R Wilson
(74) *Attorney, Agent, or Firm* — Knobbe Martens Olson & Bear LLP

(57) ABSTRACT

Systems and methods are disclosed for the generation and interactive display of three-dimensional (3D) building models, for the determination and simulation of risk associated with the underlying buildings, for the prediction of changes to the underlying buildings associated with the risk, for the generation and display of updated 3D building models factoring in the risk or predicted changes, and for the collection and display of relevant contextual information associated with the underlying building while presenting a 3D building model. The 3D building model can be displayed in an augmented reality (AR) view, and a user can interact with the 3D building model via controls present in the AR view and/or by moving within the real-world location in which the user is present.

19 Claims, 18 Drawing Sheets

AUGMENTED REALITY APPLICATION FOR INTERACTING WITH BUILDING MODELS

CROSS-REFERENCE TO RELATED APPLICATIONS

This application claims priority under 35 U.S.C. § 119(e) to U.S. Provisional Application No. 62/743,450, entitled "INTERACTIVE DATA VISUALIZATION CENTER" and filed on Oct. 9, 2018, which is hereby incorporated by reference herein in its entirety.

FIELD OF THE DISCLOSURE

The described technology generally relates to the generation and interactive display of three-dimensional (3D) building models and their associated contextual information through an augmented reality application.

BACKGROUND

Augmented reality (AR) systems, such as the Microsoft HoloLens™, have been gaining in popularity with recent advancements in technology. Augmented reality describes technology that delivers an interactive experience of a real-world environment, where the objects that reside in the real-world are enhanced by computer-generated perceptual information. The computer-generated perceptual information can be seamlessly overlaid and interwoven with the physical world, such that it is perceived as an immersive aspect of the real-world environment. In other words, components of the digital world can be blended into a person's perception of the real world in a way that they are perceived as natural parts of an environment (e.g., altering a user's perception of the real-world environment).

SUMMARY OF THE DISCLOSURE

Described herein are systems and methods for the generation and interactive display of 3D building models, for the determination and simulation of risk associated with the underlying buildings, for the prediction of changes to the underlying buildings associated with the risk, for the generation and display of updated 3D building models factoring in the risk or predicted changes, and for the collection and display of relevant contextual information associated with the underlying building while presenting a 3D building model.

Various aspects of the novel systems and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to any systems and/or devices that could benefit from universal facial expression. The detailed description and drawings are merely illustrative of the disclosure rather than limiting, the scope of the disclosure being defined by the appended claims and equivalents thereof.

In various embodiments, a computer-implemented method is disclosed that is implemented by an augmented reality (AR) modeling system having one or more hardware processors. The computer-implemented method may include the steps of: obtaining a three-dimensional (3D) model of a building; obtaining a 3D digital elevation model associated with the building; determining an environmental risk factor associated with the building based on a geographic location of the building; simulating an effect of the environmental risk factor on the building using the 3D digital elevation model; and causing display, in an AR view, of the 3D model with a visualization depicting results of simulating the effect of the environmental risk factor on the building.

In some embodiments, the 3D digital elevation model indicates position and elevation of points of interest surrounding the building. In some embodiments, the 3D digital elevation model is generated using data captured by a drone. In some embodiments, the environmental risk factor is one of: a flood, a flash flood, storm surge, hail, a hurricane, an earthquake, a wildfire, a volcanic eruption, or erosion. In some embodiments, the computer-implemented method may further include the steps of: obtaining contextual information associated with one or more features of the building; and causing display of the contextual information with the displayed 3D model. In some embodiments, the computer-implemented method may further include the steps of: obtaining an image captured of an interior of the building; and causing display of the image with the displayed 3D model. In some embodiments, the image is a 360 degree image.

In some embodiments, the displayed 3D model rotates as a user moves a device displaying the 3D model around an anchor location of the 3D model in a real-world location in which the user is present. In some embodiments, selection of a user interface element in the AR view causes the displayed 3D model of the building to transition into a dollhouse view of the building in which individual layers of the 3D model can be removed or split from other layers of the 3D model. In some embodiments, after selection of the user interface element, a first layer of the 3D model split from the other layers of the 3D model can be manipulated by a user within the AR view separately from the other layers of the 3D model. In some embodiments, the simulated effect of the environmental risk factor comprises damage to the building, and wherein the visualization comprises a change to the 3D model resulting from the damage to the building. In some embodiments, the simulated effect of the environmental risk factor comprises damage to the building, and wherein the visualization comprises a visual indicator corresponding to the 3D model that indicates the damage to the building.

In some embodiments, the visualization comprises a second 3D model representing the simulated effect. In some embodiments, the 3D model is displayed using an AR device or mobile device.

In various embodiments, non-transitory computer storage media is disclosed that stores instructions. These instructions, when executed by one or more hardware processors of an augmented reality (AR) modeling system, cause the AR modeling system to perform operations that include that steps of: obtaining a three-dimensional (3D) model of a building; obtaining a 3D digital elevation model associated with the building; determining an environmental risk factor associated with the building based on a geographic location of the building; simulating an effect of the environmental risk factor on the building using the 3D digital elevation model; and causing display, in an AR view, of the 3D model with a visualization depicting results of simulating the effect of the environmental risk factor on the building.

In some embodiments, the 3D digital elevation model indicates position and elevation of points of interest surrounding the building. In some embodiments, the environmental risk factor is one of: a flood, a flash flood, storm surge, hail, a hurricane, an earthquake, a wildfire, a volcanic eruption, or erosion. In some embodiments, the displayed 3D model rotates as a user moves a device displaying the 3D model around an anchor location of the 3D model in a real-world location in which the user is present.

In various embodiments, an augmented reality (AR) modeling system is disclosed that includes computer storage media storing instructions and one or more hardware processors configured to execute the instructions. The instructions, when executed, cause the one or more hardware processors to perform operations that include: obtaining a three-dimensional (3D) model of a building; obtaining a 3D digital elevation model associated with the building; determining an environmental risk factor associated with the building based on a geographic location of the building; simulating an effect of the environmental risk factor on the building using the 3D digital elevation model; and causing display, in an AR view, of the 3D model with a visualization depicting results of simulating the effect of the environmental risk factor on the building.

In some embodiments, the displayed 3D model rotates as a user moves a device displaying the 3D model around an anchor location of the 3D model in a real-world location in which the user is present.

BRIEF DESCRIPTION OF THE DRAWINGS

The following drawings and the associated description herein are provided to illustrate specific embodiments of the disclosure and are not intended to be limiting.

DETAILED DESCRIPTION

Figure 1:
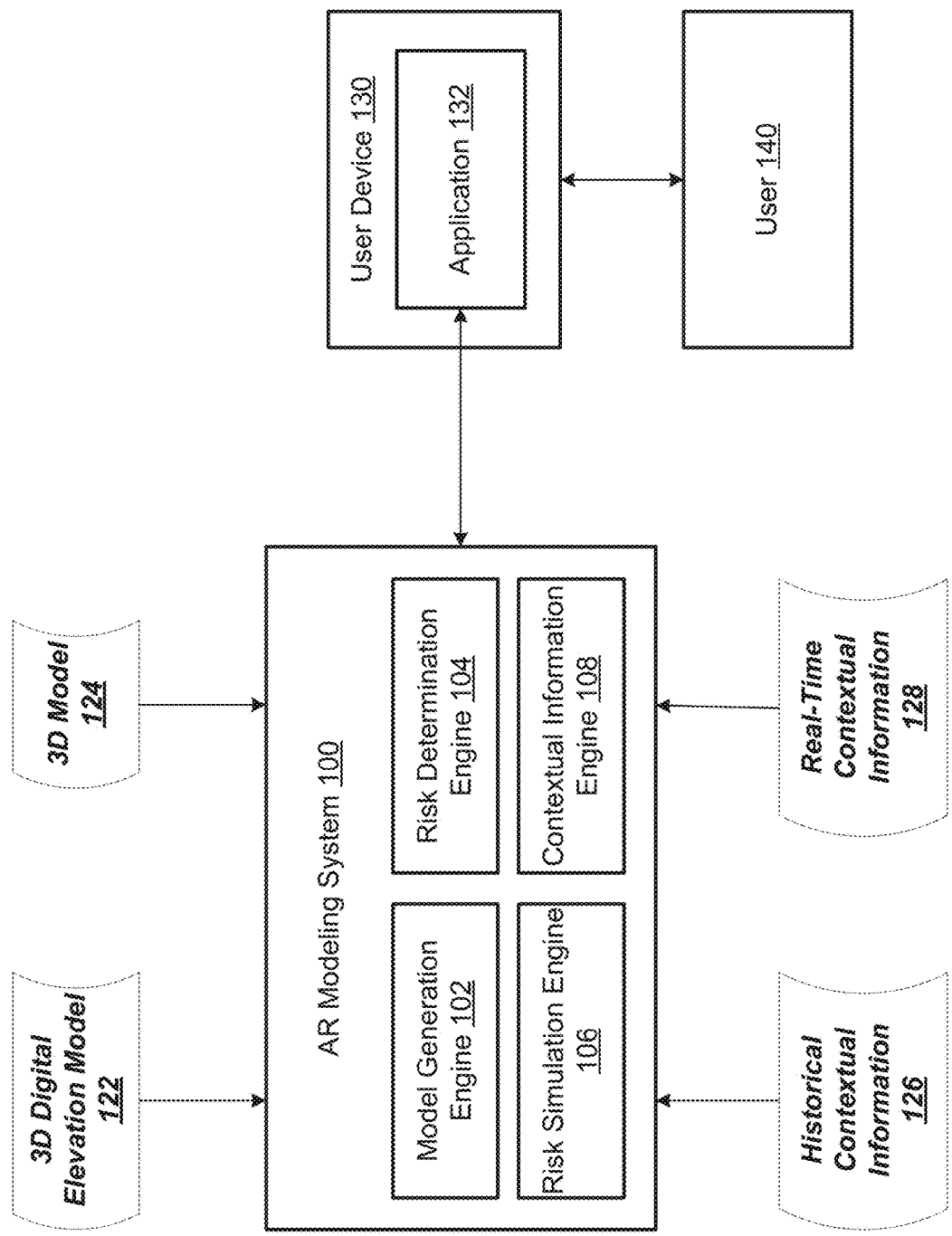
FIG. 1 illustrates a block diagram of an example AR modeling system, in accordance with embodiments of the present disclosure.

Augmented reality is often used to enhance natural environments or situations and offer perceptually enriched experiences (e.g., enhancing the perception of reality), while also presenting information about the surrounding real world and its objects (e.g., overlaid on the real world) to the user in a manner that can be interacted with and digitally manipulated. For example, for a building of interest, AR applications can be used to show a virtualized view of a building's structures and systems super-imposed on a real-life view.

However, these AR applications often just focus on visually presenting the underlying building and any associated characteristics from the time the model of the building was generated. In reality, buildings and their characteristics can change in real-time, such as due to damage (e.g., from environmental risks). In certain instances, these changes may be predictable. It may be very useful (e.g., to insurers) to be able to update the virtual model of a building with these changes in real-time and also provide any relevant contextual information in real-time.

Accordingly, there exists a need for an AR system that is not only capable of presenting virtual models of buildings, but also predicting changes to buildings (e.g., based on environmental risk), generating and presenting virtual models of buildings reflecting any predicted or actual changes, and providing up-to-date, relevant contextual information associated with the buildings. Embodiments of the present disclosure address these issues and more.

This specification describes computer-based systems and methods for the generation and interactive display of 3D building models, for the determination and simulation of risk associated with the underlying buildings, for the prediction of changes to the underlying buildings associated with the risk, for the generation and display of updated 3D building models factoring in the risk or predicted changes, and for the collection and display of relevant contextual information associated with the underlying building while presenting a 3D building model. The 3D building model can be displayed in an AR view, and a user can interact with the 3D building model via controls present in the AR view and/or by moving within the real-world location in which the user is present.

In order to facilitate an understanding of the systems and methods discussed herein, a number of terms are described below. The terms described below, as well as other terms used herein, should be construed broadly to include the provided definitions, the ordinary and customary meaning of the terms, and/or any other implied meaning for the respective terms.

As user herein, a three-dimensional (3D) model can refer to a collection of points in 3D space, connected by various geometric entities or shapes such as triangles, lines, curved surfaces, etc., to represent an object (e.g., a building). The 3D model can be created manually using a computing device, algorithmically (procedural modeling), or by scanning blueprints, floor plans, or other similar documents. The surfaces of the 3D model may be further defined with texture mapping. In some embodiments, a 3D model can be a wireframe mesh, or point-cloud, model of an object (e.g., a building, furniture, an appliance, or any other physical structure), with textures (e.g., blended textures) on the model or images (or videos) appended to the model. A 3D model may define both the exterior and the interior of the object. A 3D model can be divided into a plurality of sections or portions that are associated with the various parts or features in the object associated with the model (e.g., structures, rooms, adornments, and so forth).

As used herein in reference to user interactions with data displayed by a computing system, "user input" is a broad term that refers to any type of input provided by a user that is intended to be received and/or stored by the system, to cause an update to data that is displayed by the system, and/or to cause an update to the way that data is displayed by the system. Non-limiting examples of such user input include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse.

As used herein, a data store can refer to any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

As used herein, a database can refer to any data structure (and/or combinations of multiple data structures) for storing and/or organizing data, including, but not limited to, relational databases (e.g., Oracle databases, mySQL databases, and so on), non-relational databases (e.g., NoSQL databases, and so on), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Example Model Generation and Display System

With regards to the figures, FIG. 1 illustrates a block diagram of an example AR modeling system 100 that can be used to display a 3D model based on a building, determine relevant risks associated with the building (e.g., environmental risks), simulate those risks using the appropriate inputs, and modify the display of the 3D model based on the simulated risks. The AR modeling system 100 can be a system of one or more computers, one or more virtual machines executing on a system of one or more computers, and so on. The functionality of the AR modeling system 100 can also be distributed across multiple systems, even systems associated with different entities. For instance, the determination and simulation of risk can be performed by a first system of one or more computers (e.g., a cloud computing cluster), while any functions associated with the display of the 3D model can be performed by a second system of one or more computers. In some embodiments, one or more functions performed by the AR modeling system 100 can be performed or replaced by the application 132 running on the user device 130.

The AR modeling system 100 may have various components, such as a model generation engine 102, a risk determination engine 104, a risk simulation engine 106, and a contextual information engine 108. In some embodiments, the AR modeling system 100 may receive, from an outside source, one or more 3D models associated with a particular building (e.g., the 3D digital elevation model 122 and the 3D model 124).

For example, the AR modeling system 100 may receive or have access to a 3D model 124 of the building that was previously generated. In some cases, the 3D model 124 may model both the exterior and the interior of the building and their associated features (e.g., exterior features such as the roof, windows, sidings, doors, etc., and interior features such as hallways, doors, fixtures, appliances, flooring, etc.). In some cases, the 3D model 124 may have metadata associated with it, such as positioning data (e.g., GPS coordinates) for various features of the model or different parts of the model may be classified and labeled based on the corresponding part of the underlying building (e.g., this room of the model is the master bedroom). The 3D model 124 may also have images (e.g., captured images of the exterior or interior and/or captured video of the exterior or interior) appended to different locations on the model. For instance, an image or video captured of the interior of the building may have been taken at a particular location, such as the kitchen. The image or video may be appended to the part of the 3D model 124 that corresponds to the kitchen of the building. Appending an image (or video) to a portion of the 3D model 124 can include creating metadata that associates an image (or video) with a location within the 3D model 124 (where the metadata is stored or otherwise associated with the 3D model 124), modifying a portion of the 3D model 124 to point to an image (or video) identifier or a storage location of an image (or video), modifying a portion of the 3D model 124 to store the image (or video) such that the image (or video) is displayed with the portion of the 3D model 124 is accessed, and/or the like.

The AR modeling system 100 may also receive or have access to a 3D digital elevation model 122 associated with the particular building. The 3D digital elevation model 122 may be of a model for points of interest surrounding the particular building, such as the position, structure, and/or elevation of surrounding buildings, trees, landmarks, etc.; the terrain and/or topography of the surrounding neighborhood; the position, size, and/or shape of nearby bodies of water, and so forth. In some cases, the 3D digital elevation model 122 may have been generated from videos, images, and/or mapping data captured by a drone or other manned or unmanned aerial vehicle flying around the actual neighborhood. In some embodiments, a user may be able to view and explore the 3D digital elevation model 122, such as zooming, panning, and so forth.

In some embodiments, the AR modeling system 100 may be able to generate one or both models (e.g., the 3D digital elevation model 122 and the 3D model 124) itself instead of obtaining the models from a separate source. For instance, the AR modeling system 100 may receive videos, images, and/or mapping data captured by a drone (or other manned or unmanned aerial vehicle) for the neighborhood and the model generation engine 102 may be configured to generate a 3D digital elevation model 122 from that information. As another example, the AR modeling system 100 could receive videos, images, and/or mapping data captured by a drone (or other manned or unmanned aerial vehicle) or a portable device (e.g., a camera, a mobile phone, etc.) for the exterior and interior of a building and the model generation engine 102 may be configured to generate a 3D model 124 of the building using that information. The model generation engine 102 may also be configured to append images (e.g., captured images of the exterior or interior and/or captured video of the exterior or interior) to different locations on the generated 3D model 124. For instance, an image (or video) captured of the interior map be appended to a position in the 3D model 124 that virtually corresponds to the location the image (or video) was taken for the building. The model generation engine 102 can generate a 3D digital elevation model or a 3D model of a building using the same or similar operations executed by the devices and/or model generation and display system described in U.S. patent application Ser. No. 16/596,605, entitled "GENERATION AND DISPLAY OF INTERACTIVE 3D REAL ESTATE MODELS", which is hereby incorporated by reference herein in its entirety.

The AR modeling system 100 can have access to and/or be configured to generate any number of 3D models and/or any number of 3D digital elevation models. For example, each 3D model can be associated with a particular building, and the AR modeling system 100 can have access to and/or be configured to generate a separate 3D model for individual buildings in a geographic region. Similarly, each 3D digital elevation model can be associated with a particular geographic region, and the AR modeling system 100 can have access to and/or be configured to generate a separate 3D digital elevation model for different geographic regions.

The AR modeling system 100 may provide the 3D model 124 to a user device 130 to be displayed to a user 140 through an application 132. The user device 130 may be an AR device, including AR headsets or AR glasses, or a mobile device, such as a mobile phone or tablet, that can render the 3D model 124 on a display screen (e.g., either by itself or as a superimposed overlay on displayed images of the real world, as captured through a camera of the mobile device). Thus, the user 140 may be able to view and manipulate the 3D model 124 through the user device 130, in order to see the 3D model 124 of the building from different angles, layers, floors, elevations, and so forth. The user 140 may be able to select appended images (and/or videos) associated with a particular position in the 3D model 124 (and location in the underlying building) in order to view the appended image (or video) through the user device 130 and virtually "see" inside the building from the perspective of the location the image (or video) was taken. If an image (e.g., a still image of a portion of a room, a 360 degree image of a room, etc.) (or video) is tied to a particular room of the building, the positioning of the location the image was taken can be tied to the corresponding position in the 3D model 124, so that the perspective of the image (or video) shown through the user device 130 can change naturally as the 3D model 124 is rotated by the user 140. As an illustrative example, if an image (or video) was captured from a center of a room and depicts a window at one end of the room, the AR modeling system 100 can tie the image (or video) to a position in the 3D model 124 corresponding to the center of the room, and provide an option to the user 140 via the user device 130 to view the image (or video) when, for example, the user 140 has positioned the 3D model 124 in a way such that a 3D representation of the window at the end of the room is visible. Optionally, the user device 130 can provide an option to view the image (or video) regardless of the direction being viewed by the user 140 (e.g., the user device 130 can provide an option to view the image regardless of the viewing direction if the image is a 360 degree image).

In some embodiments, the AR modeling system 100 may receive, from one or more outside sources, contextual information associated with a particular building or property of interest (e.g., historical contextual information 126 and real-time contextual information 128). The historical contextual information 126 and the real-time contextual information 128 may include any relevant information useful in assessing the current status or characteristics of the property, the risks and costs associated with the property, information about features or items within the property, and so forth. Real-time contextual information 128 can be collected in real-time (e.g., within a few seconds from when the real-time contextual information 128 is produced, with the amount of delay between when the real-time contextual information 128 is produced and when the real-time contextual information 128 is collected being dependent on network latency, processing delays, etc.) from live data feeds offered by various data providers. Non-limiting examples of the real-time contextual information 128 may include geospatial data, maps, hazard data (e.g., data related to natural disasters, such as floods, earthquakes, wildfires, hurricanes, tornados, etc.), and/or weather data from live feeds offered by various services (e.g., mapping services, natural disaster monitoring services, weather services, etc.); live data associated with real estate transactions, such as data indicating the property has a new owner, new mortgage, or new valuation (this can include data indicating a property has been sold for X value or has a lien on it); live data describing features or items of interest within the property (e.g., the current cost and/or specifications for a refrigerator); and/or live data for the current costs associated with repairing a structure (e.g., current costs associated with replacing shingles on the roof of the property (e.g., the current costs to purchase the shingles from suppliers, the current labor costs in the area for replacing those shingles, and so forth), current costs associated with repaving a driveway, current costs associated with repairing damage to sidings, and so forth). Historical contextual information 126 does not need to be collected from streaming data feeds. Historical contextual information 126 may include historical data associated with real estate transactions, such as a history of sales and sale prices for a particular property. The historical contextual information 126 may also include historical data relevant for generating predictive models to simulate risk, such as large amounts of data detailing the characteristics of various past risk or environmental events and the damage caused by them to different properties and/or geographic regions. For example, the historical contextual information 126 can include historical hazard data (including how such hazards affected different properties, geographic regions, etc.), historical weather data (including how such weather affected different properties, geographic regions, etc.), and so forth.

The AR modeling system 100 may have a contextual information engine 108 that is configured to process, organize, and/or store all the different contextual information being received from the different data sources. The contextual information engine 108 may be configured to identify the relevant contextual information on-hand that is associated with the building that the 3D model 124 is based on. The contextual information engine 108 may provide some of that contextual information to the user device 130 to be presented to the user 140 via the application 132 (e.g., when the user 140 is viewing the 3D model 124 through the application 132).

The AR modeling system 100 may have a risk determination engine 104, which may be able to determine relevant risk factors associated with the property of interest, such as environmental risk factors. There may be multiple environmental risk factors (also referred to herein as "hazards") associated with a building, such as, but not limited to, floods, flash floods, storm surges, hail, hurricanes, earthquakes, wildfires, volcanic eruptions, erosion, and so forth. In some cases, relevant environmental risk factors may be dependent on the geographic location for the property of interest and the environment surrounding the property of interest. For instance, certain geographic regions in the United States are more likely to have heavy rainstorms that result in floods, and the flood risk can be further increased if the property of interest is located right next to an ocean or an area of lower elevation. Thus, for example, flooding may be an especially relevant risk for a building located along the coast of Florida.

The AR modeling system 100 may have a risk simulation engine 106 that is capable of simulating various environmental risks (e.g., using a predictive model) associated with the property in order to make predictive suggestions regarding what is likely to happen to the property in specific scenarios. For instance, the risk simulation engine 106 may be able to predict what will happen to a beachfront home as a consequence of a hurricane or a hailstorm. In addition to the structure of the home and the surrounding neighborhood (e.g., from the 3D model 124 and the 3D digital elevation model 122), the risk simulation engine 106 may have or obtain information indicating the age of construction of the home, the age of the roof, the age and condition of the windows, and any additional relevant contextual information for the home (which can be determined from the 3D model 124, or obtained as part of historical contextual information 126 or real-time contextual information 128). In the hail scenario, newer homes are built to code and can withstand hail pretty well. However, in areas with older building codes and older homes, even smaller sized hail (e.g., 2 inches in diameter) can be very impactful. Based on the characteristics of this particular home, the risk simulation engine 106 would be able to predict the damage to the home under 2 inch hail (e.g., broken windows). In some embodiments, the risk simulation engine 106 may provide that information to the model generation engine 102 for making display modifications or changes to the 3D model 124 that show the damage associated with the hail and pushing those updates to the application 132. The application 132 may also be able to display hail (or graphics associated with other environmental events, such as wind or floodwater) of 2 inch size around the model of the property.

As another example, the risk simulation engine 106 may be able to predict what the wind or a flood will look like (and how it would affect a building or surrounding neighborhood) as a consequence of a hurricane ranging from category 1 to category 5 Like before, the risk simulation engine 106 may have or obtain information indicating the structure of the home and the surrounding neighborhood (e.g., from the 3D model 124 and the 3D digital elevation model 122), along with the age of construction of the home, the age of the roof, the age and condition of the windows, and any additional relevant contextual information for the home (which can be determined from the 3D model 124, or obtained as part of historical contextual information 126 or real-time contextual information 128). Based on the characteristics of this particular home, the risk simulation engine 106 may be able to predict the damage to the home depending on the storm severity. The risk simulation engine 106 may provide that information to the model generation engine 102 for making display modifications or changes to the 3D model 124 that show the damage associated with the wind and rain and pushing those updates to the application 132 to be viewed by the user 140. The application 132 may also be able to display the wind velocity associated with the storm or a three-dimensional model of the flood around the property or in the neighborhood. Thus, the user 140 may be able to see how a flood in that neighborhood would appear, the depth of the flood, and the accompanying damage to the property of interest, for different categories of storm severity. In some cases, the application 132 may also be able to show simulated reconstruction costs (e.g., the average annual losses that an insurance company would face) based on available contextual information (e.g., historical contextual information 126 and real-time contextual information 128), such as the current costs associated with various features or aspects of the property.

As illustrated in FIG. 1, the AR modeling system 100 may be in communication with the user device 130 and an application 132 operating on the user device 130. The user device 130 can be any AR device, including AR headsets or AR glasses, or a mobile device, such as a mobile phone or tablet, that can render the 3D model 124 on a display screen (e.g., either by itself or as a superimposed overlay on displayed images of the real world, as captured through a camera of the mobile device). Optionally, the user device 130 can include a global positioning system (GPS) component that can communicate with satellites or other communication devices to determine a geographic location of the user device 130. The AR modeling system 100 may provide the 3D model 124 to a user device 130 to be displayed to a user 140 through an application 132, along with any relevant contextual information and environmental risk factors related to the property. In particular, the application 132 may inform the user 140 of the various risk components and risk layers associated with each respective property that is displayed, such as for floods, storm surges, hail, and other environmental risks.

Figure 2:
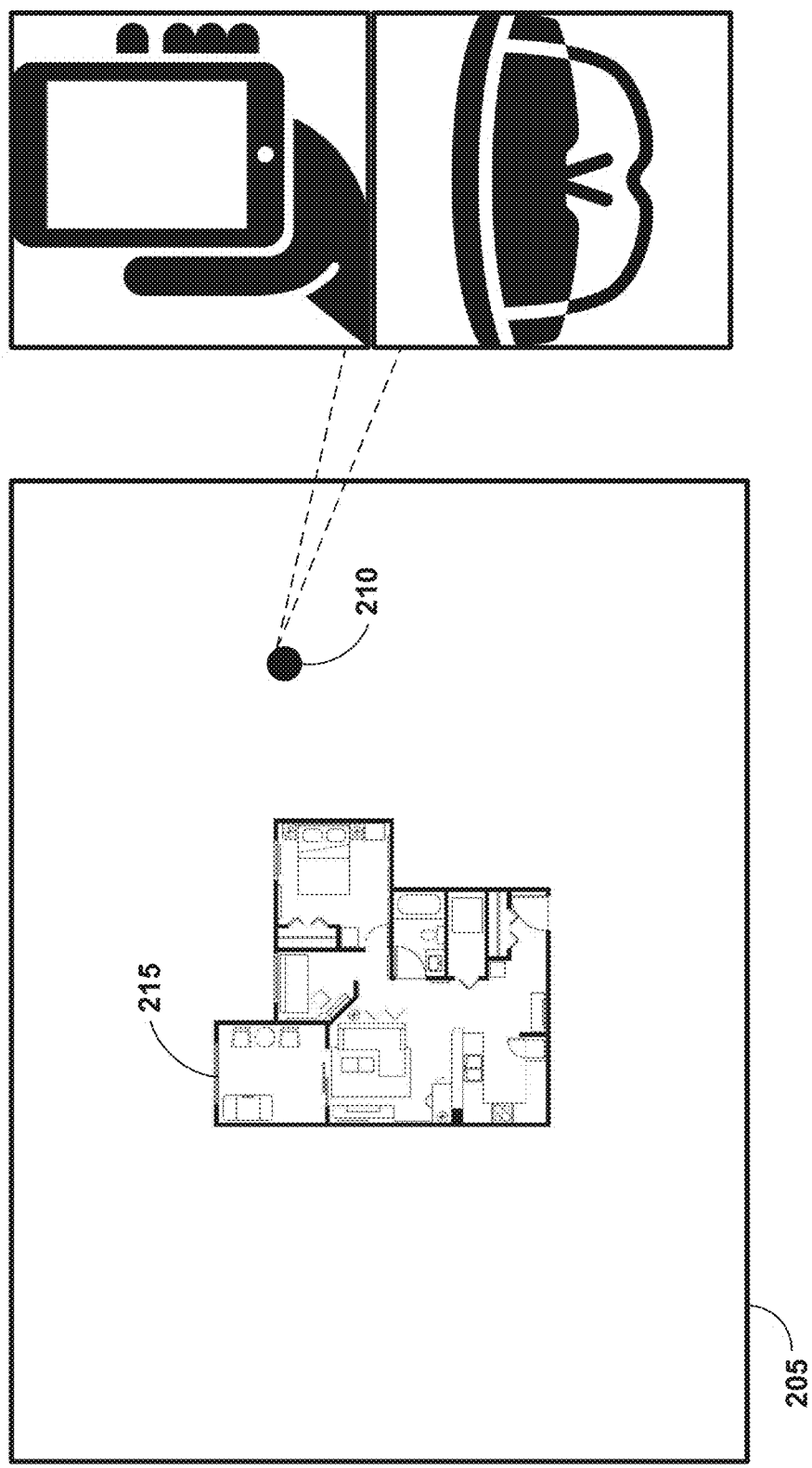
FIG. 2 illustrates an example of a 3D building model can be displayed through the AR modeling system, in accordance with embodiments of the present disclosure.

In some embodiments, the application 132 may be capable of displaying the 3D model 124 as a superimposed overlay over the user's surrounding physical environment that is visually locked in place (e.g., if the 3D model 124 is displayed in the corner of the room the user is in, the 3D model 124 may continue to be displayed there even if the location or orientation of the user device 130 changes within the room). In other words, the user 140 may be able to see the room that they are in through the display of the user device 130 and the 3D model 124 may be simulated and shown through the display (at least partially covering the display of the room in which the user 140 is present), as if the 3D model 124 was an actual physical object within the room. For instance, as shown in FIG. 2, a user 210 may be physically present in a room 205. When viewing the room 205 through their user device (e.g., an AR device or mobile device with a camera/display), a virtual 3D model 215 of a building can be rendered and displayed through the user device as if the virtual 3D model 215 occupied a position in the room 205. As the user 210 walks around the room 205, the virtual 3D model 215 may continue to be rendered at the same position and orientation in the room 205. Thus, if the user 210 walks to one side of the room 205, the user 210 may see a backside of the virtual 3D model 215, and if the user 210 walks to another side of the room 205, the user 210 may see a frontside of the virtual 3D model 215.

For the cases in which the user device is a mobile device, the user 210 may be able to lock the view of the virtual 3D model 215 displayed on the screen of the user device, so that the user 210 can walk around with the user device in hand. The display of the virtual 3D model 215 may change depending on the positioning of the user device relative to the position of the virtual 3D model 215 in physical space. For example, if the user 210 walks towards the virtual 3D model 215 with user device in hand, the displayed virtual 3D model 215 on the screen of the user device may get larger. If the user 210 walks around the virtual 3D model 215 with user device in hand, the screen of the user device may show the virtual 3D model 215 from different angles corresponding to the location of the user 210. In general, moving the user device closer to the position of the virtual 3D model 215 in physical space (e.g., such as by the user bending down) may magnify and present the virtual 3D model 215 with more detail and the user could walk around the virtual 3D model 215 in order to see it from different angles. In addition, the user may be able to split up the virtual rooms and/or virtual stories of the virtual 3D model 215 and look into specific rooms and/or specific stories with additional detail.

For the cases in which the user device is an AR device (e.g., AR glasses) such as the MICROSOFT HOLOLENS, the view of the virtual 3D model 215 displayed on the screen may operate similarly. However, there may be additional features that facilitate greater immersion, such as generating and displaying simulated rooms of the virtual 3D model 215 to enable the user to virtually walk around the room and inspect the room itself (e.g., as if the user were virtually in the same room of the building of the model they are exploring). The user may be able to walk around to virtually explore the different rooms of the model and within a virtual room, the user could stand in the center of the virtual room and look around to focus on particular features or items within the room that are of interest.

Thus, the AR modeling system 100 can be utilized in a variety of practical scenarios. For instance, a user may be able to physically visit a property located at a disaster or other hazard site (e.g., following a hurricane). The user could use their user device on-location to load up a 3D model of the property retrieved from the AR modeling system 100, in order to display the simulated 3D model of the property. For example, the user device (e.g., user device 130) can determine a geographic location of the user device using a GPS component and provide this geographic location to the AR modeling system 100. The AR modeling system 100 can identify a 3D model corresponding to the geographic location (e.g., a 3D model located at the geographic location, a 3D model located within a threshold radius of the geographic location (e.g., 10 feet, 100 feet, etc.), and so forth) and transmit data corresponding to the identified 3D model to the user device that can be used by the user device to render and display the identified 3D model. As another example, the user device can determine a geographic location of the user device using a GPS component, identify a locally-stored 3D model corresponding to the geographic location, and load the identified 3D model. In some instances, multiple 3D models may correspond to a geographic location, and therefore the AR modeling system 100 can provide data for some or all of these 3D models for display and/or the user device can identify and load some or all of these 3D models. In addition, the user device can retrieve from the AR modeling system 100 and/or load from local memory graphical representations of additional geographic data for display, such as property boundary data (e.g., graphically represented as two dimensional or three dimensional lines), map data (e.g., location of roads, driveways, alleys, etc., which can be graphically represented as two dimensional or three dimensional lines), and so forth. As described herein, a 3D model may be a graphical representation of an actual object located at a specific geographic location. The user device can position a 3D model at the specific geographic location where the actual object is located (or was located if a hazard damaged or destroyed the actual object). Similarly, the user device can position graphical representations of the additional geographic data at the specific geographic location corresponding to the additional geographic data. Thus, the user device may display a 3D model if the camera of the user device is capturing the specific geographic location of the actual object represented by the 3D model, and may display a graphical representation of additional geographic data if the camera of the user device is capturing the specific geographic location of the additional geographic data. If the user moves the user device such that the camera of the user device is no longer capturing the specific geographic location of the actual object represented by a 3D model or the specific geographic location of the additional geographic data, then the user device may not show the 3D model or graphical representation of the additional geographic data as being visible (even though the user and user device are still located at a geographic location near the specific geographic location of the actual object represented by the 3D model or of the additional geographic data, such as at a geographic location within a threshold radius of the specific geographic location of the actual object represented by the 3D model or of the additional geographic data). Accordingly, as a user navigates the disaster or other hazard site, the user device can display one or more 3D models and/or one or more graphical representations of additional geographic data that represent the state of the disaster or other hazard site before the disaster or other hazard occurred. For example, the user would be able to see, via the user device, 3D model(s), and/or graphical representation(s) of the additional geographic data, what the property originally looked like before the disaster or other hazard occurred, where certain features of the property were located, the location of real estate boundaries, and so forth, even after the property or its features were damaged or wiped away by the disaster or other hazard (e.g., by the hurricane).

As an alternative use, a realtor may be attempting to sell multiple properties. Instead of bringing a client to physically inspect ten different properties in a day, the client can view 3D models of the properties through their user device, explore the simulated exterior and interior of each of the properties, and experience any 360 degree views or video captured for the properties. The client could then select a handful of properties that they are most interested in to visit in-person.

Example of Risk Simulation

Figure 3:
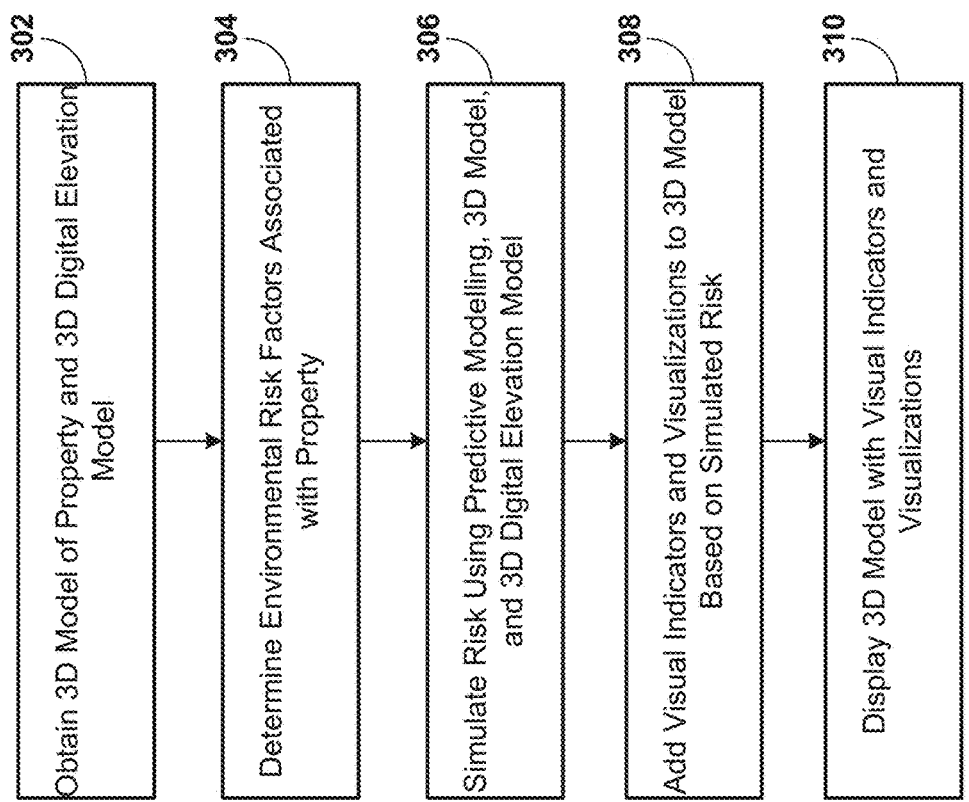
FIG. 3 is a flow chart that illustrates an example process of simulating risk and displaying its effects, in accordance with embodiments of the present disclosure.

FIG. 3 is a flow chart that illustrates an example process of risk simulation and how an AR modeling system can model and display potential risk associated with a property, in accordance with embodiments. In an embodiment, the example process illustrated in FIG. 3 is implemented by the AR modeling system 100.

At block 302, the AR modeling system may obtain a 3D model associated with a property and a 3D digital elevation model associated with the property. The 3D model associated with a property may include information for both the exterior and interior features of the property, along with any additional details necessary for risk simulation such as roof type and material; existing damage to the structure; window type, placement, and status; and so forth. The 3D digital elevation model associated with the property may include information for points of interest surrounding the property of interest, such as the topography of the surrounding neighborhood, the structure and elevation of surrounding buildings, and so forth.

In some embodiments, the AR modeling system may obtain one or both models from a separate source. In some embodiments, the AR modeling system may generate one or both models itself. For instance, in some embodiments, an aerial drone (or other manned or unmanned aerial vehicle) can fly over the neighborhood of the actual property in order to map and image a 3D view of the neighborhood that can be used to create a 3D digital elevation model. In some embodiments, a user may be able to view and explore the 3D digital elevation model, such as zooming, panning, and so forth.

At block 304, the AR modeling system may determine environmental risk factors associated with the property of interest. There may be one or more environmental risk factors associated with a property of interest, such as, but not limited to, floods, flash floods, storm surges, hail, earthquakes, wildfires, volcanic eruptions, erosion, and so forth. The environmental risk factors may be dependent on the geographic location for the property of interest. For instance, certain geographic regions in the United States are more likely to have heavy rainstorms that result in floods, certain geographic regions in the United States have the prerequisite weather conditions that make hail more likely, certain geographic regions in the United States are more likely to experience earthquakes, and so forth.

At block 306, the AR modeling system may simulate risk for the appropriate environmental risk factors (e.g., simulate an effect of one or more environmental risk factors on a building) using predictive modeling, the 3D model, and the 3D digital elevation model. For instance, the AR modeling system may be able to use the 3D digital elevation model in order to simulate the effects of a flood from a category 1 storm up to a category 5 storm. The AR modeling system may be able to simulate the effects and the flood depth in different areas of the neighborhood as the storm changes different categories, in order to predict which buildings (and the portion of those buildings) that would be affected.

At block 308, the AR modeling system may add visual indicators to the 3D model of the property of interest (e.g., highlight anticipated changes to the 3D model or render a version of the 3D model with the anticipated changes) based on the simulated risk. For instance, if the property has a portion roof that would be easily exposed as a result of wind damage, a highlighted visual can be used with that portion of the roof in the model. As a more specific example, that portion of the roof can be highlighted in red (e.g., in order to signify that the portion of the roof is under extreme impact and likely to be removed by the wind damage). The color that the roof is highlighted may indicate the severity of the impact or potential damage. In some embodiments, the 3D model can be modified or a version of the 3D model can be rendered with the anticipated changes. For instance, as a result of wind damage, the 3D model could be modified by removing a layer of a siding facing a certain direction or modifying the layer of siding to cave in. Thus, anticipated damage can be visually reflected in the 3D model presented to the user.

In addition to indicating the parts of the property that will be highly impacted by simulated risk, the AR modeling system may also generate visualizations for the simulated risk itself (e.g., a 3D risk layer) that can be shown alongside the 3D model of the property based on user-selectable parameters. These visualizations may then be viewable in a simulation mode that the user can select or toggle on or off. For example, based on the predictive modeling of storm surge flood risk (e.g., at block 306), the AR modeling system may generate a three-dimensional visual representation of a flood in the neighborhood that simulates what the flood would look like for different storm categories (e.g., storms of category 1 through 5). As a specific example, if the property is a 3-story building, then in a category 1 storm, half of the first floor of the property can be shown as flooded (e.g., the water layer is up to half of the first floor); in a category 2 storm, the entire first floor of the property can be shown as flooded, and so forth. The user can opt to view the 3D risk layer (e.g., the three-dimensional visual representation) in conjunction with the 3D model by toggling on a button in a user interface, selecting a box in the user interface, selecting a menu item in the user interface, and so forth.

There can also be a visual representation generated by the AR modeling system for the associated wind for the different storm categories, which shows winds of varying velocities, the impact of the wind on the property of interest, and so forth; for the damage produced by earthquakes of different magnitudes; for the ash or lava produced by different types of volcanic eruptions, which shows ash or lava of different amounts, the impact of the ash or lava on the property of interest, and so forth. Thus, a user may be able to see a visual representation of the wind and flood from the storm surge for different simulated storm categories, the damage from earthquakes of different magnitudes, the ash or lava from different types of volcanic eruptions, and/or the effects of any other type of hazard, which can be shown on top of the 3D model of the property with any indicators or modifications to the 3D model resulting from anticipated damage caused by the hazard.

At block 310, the AR modeling system may cause the 3D model and any added visual indicators or visualizations to be displayed to the user. For instance, data for the 3D model, visual indicators, visualizations may be sent over to the display device (e.g., the augmented reality headset or mobile device), which can display all of it on-screen to a user.

Example of Interactive Displays

Figure 4:
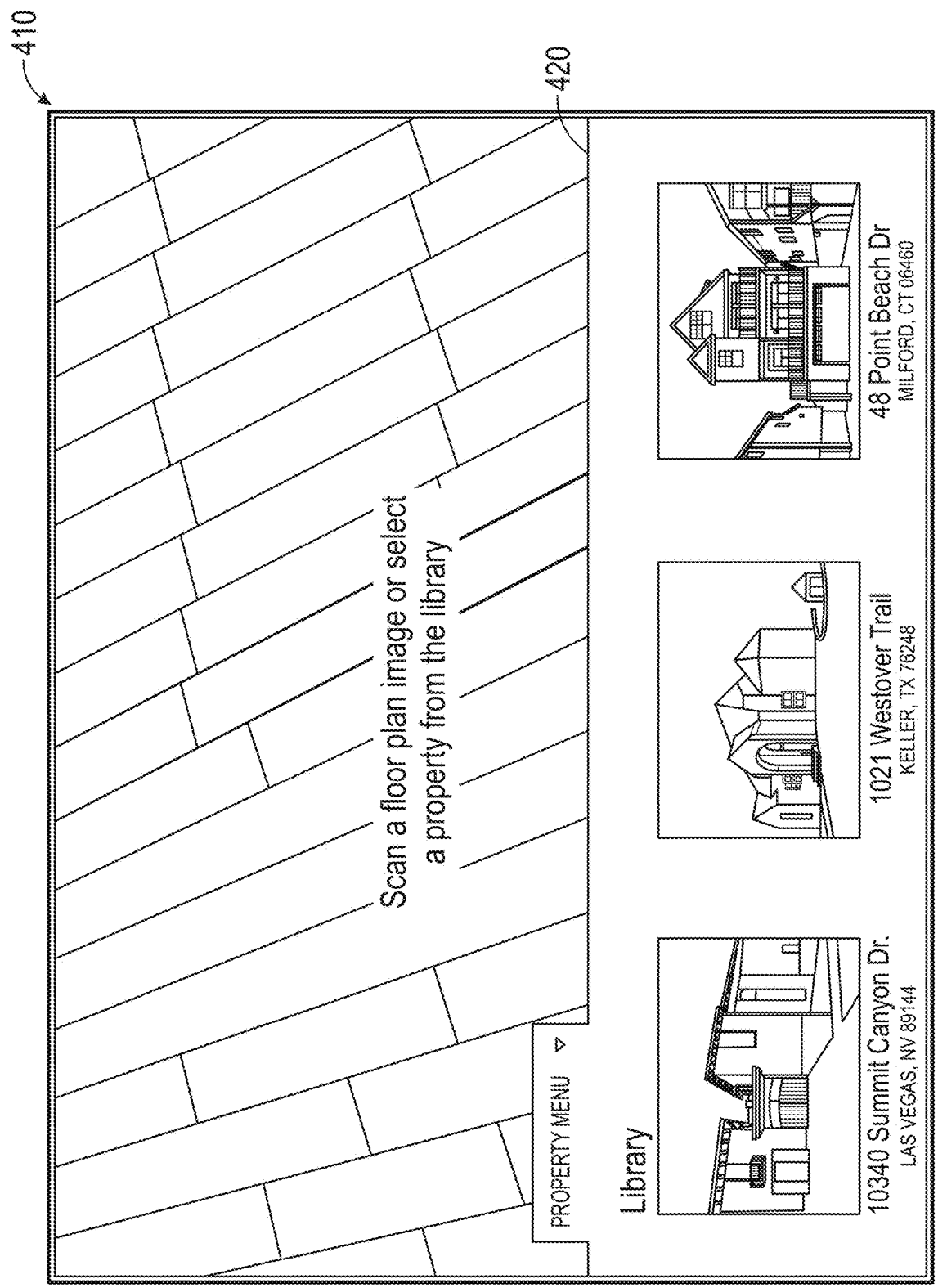
FIGS. 4-17 illustrate example user interfaces for presenting 3D building models, simulated risk, and contextual information, in accordance with embodiments of the present disclosure.

FIG. 4 illustrates an example user interface for presenting 3D building models, simulated risk, and contextual information, in accordance with embodiments of the present disclosure. Data for the example user interface illustrated in FIG. 4 can be generated by the AR modeling system 100, and the example user interface can be rendered and displayed by the application 132 of the user device 130.

In some embodiments, a view 410 may be presented to the user (e.g., through a display device, such as an augmented reality headset). The view 410 may prompt the user to scan a floor plan image (not shown in the figure) or to select a property from the library, which may involve selecting one of the properties presented in the property menu 420.

Figure 5:
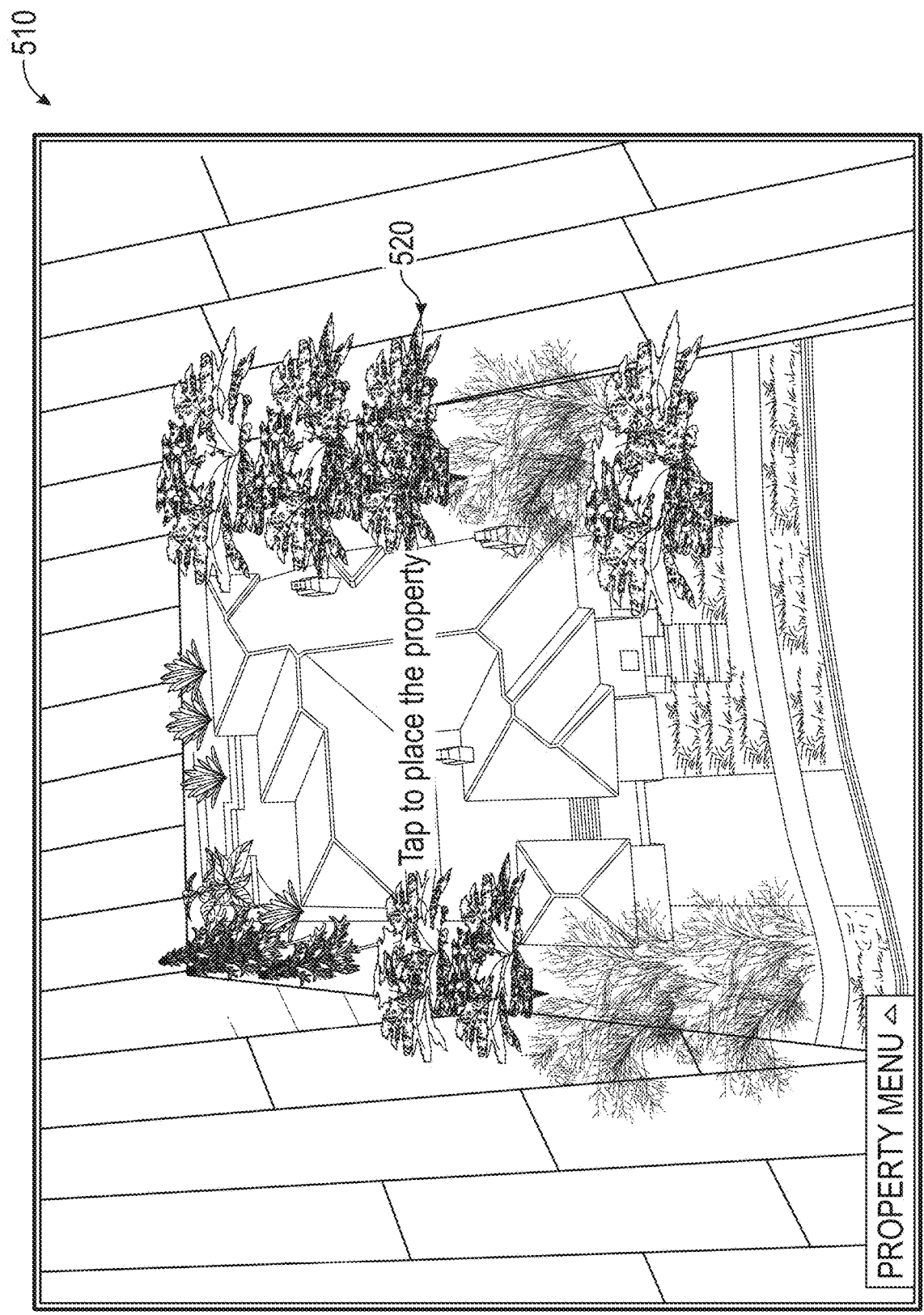

FIG. 5 illustrates an example user interface for presenting 3D building models, simulated risk, and contextual information, in accordance with embodiments of the present disclosure. Data for the example user interface illustrated in FIG. 5 can be generated by the AR modeling system 100, and the example user interface can be rendered and displayed by the application 132 of the user device 130.

Selecting one of the properties in the property menu 420, such as the house at "10340 Summit Canyon Dr.", may result in the view 510 in FIG. 5 being presented to the user (e.g., through a display device, such as an augmented reality headset).

The view 510 shows an at least partially transparent overlay 520 of a property model for the selected property (e.g., the house at "10340 Summit Canyon Dr.") that the user may move around and tap (e.g., provide a user input) in order to place the virtual property model on a recognized surface in their field of view. Because the overlay 520 is at least partially transparent, the user may be to see both the property model for the selected property and a portion of the actual location in which the user is present as captured by a camera of the user device.

Figure 6:
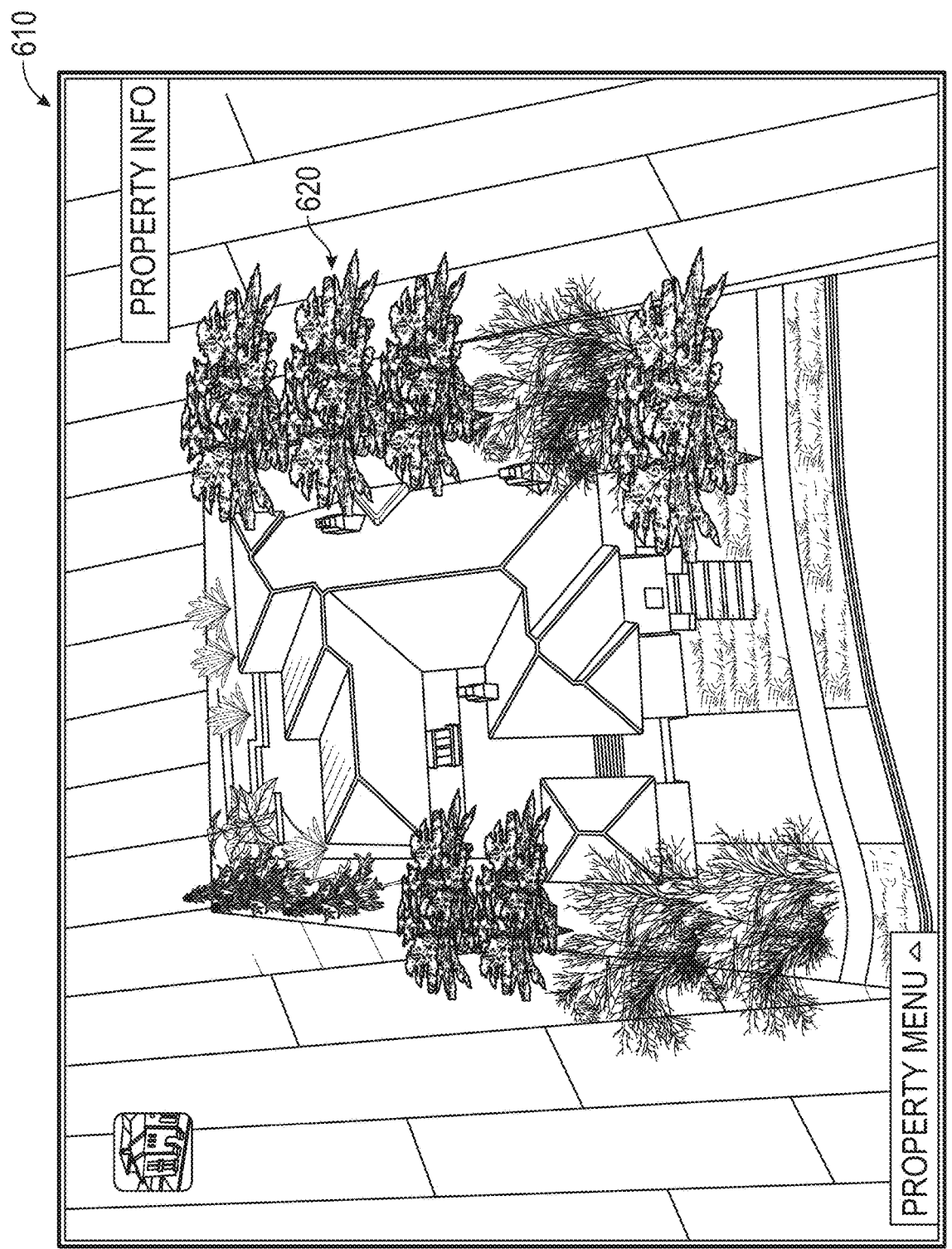

FIG. 6 illustrates an example user interface for presenting 3D building models, simulated risk, and contextual information, in accordance with embodiments of the present disclosure. Data for the example user interface illustrated in FIG. 6 can be generated by the AR modeling system 100, and the example user interface can be rendered and displayed by the application 132 of the user device 130.

Tapping on a recognized surface, as prompted by view 510, may result in the view 610 in FIG. 6 being presented to the user (e.g., through a display device, such as an augmented reality headset). The view 610 shows the property model 620 placed where the tapping occurred. In some cases, the property model 620 may appear simply by making opaque the at least partially transparent overlay 520 of the property model shown in view 510. The property model 620 may or may not be locked in place. For example, the property model 620 can be locked or tied to a certain location in which the user is present.

Figure 7:
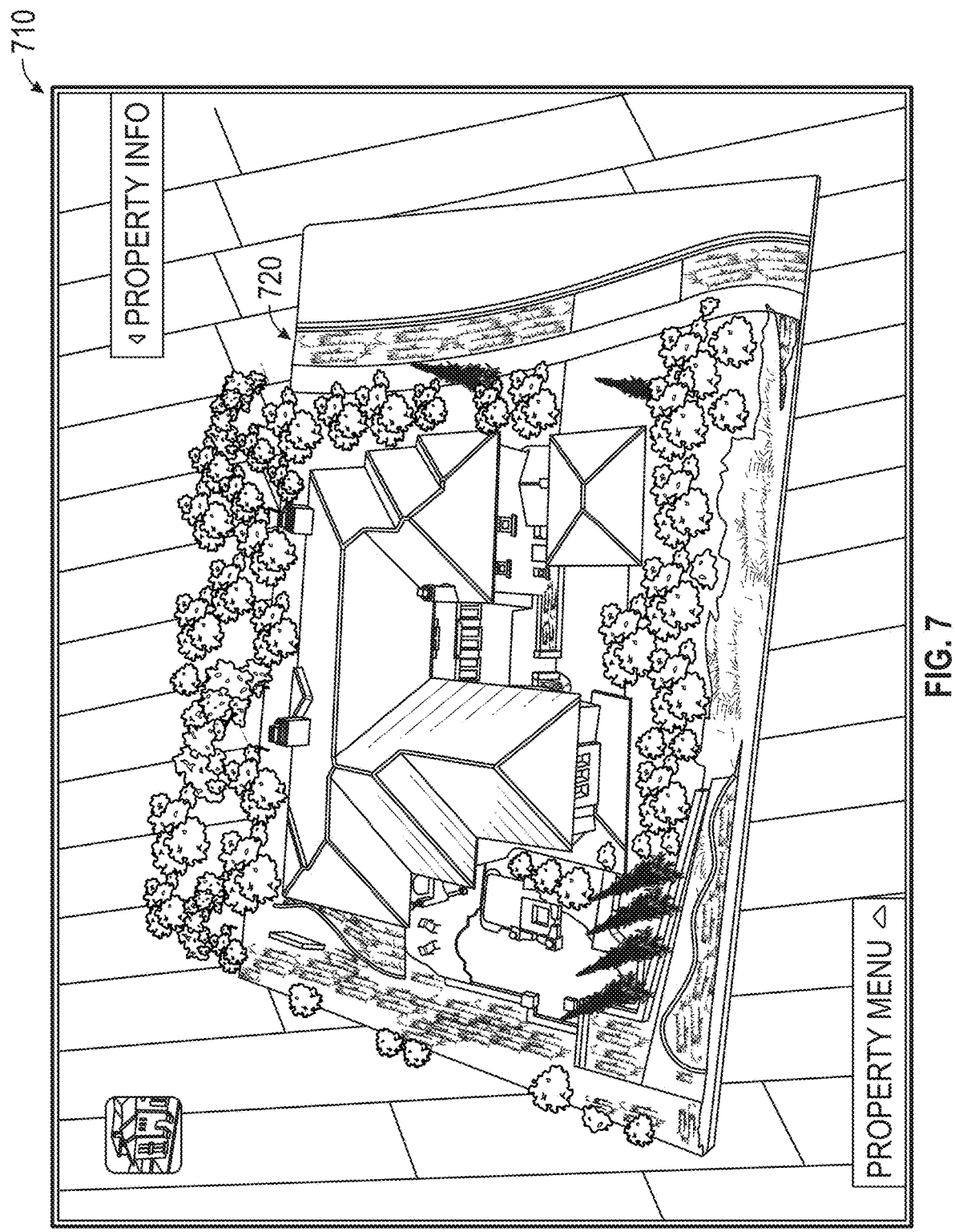

FIG. 7 illustrates an example user interface for presenting 3D building models, simulated risk, and contextual information, in accordance with embodiments of the present disclosure. Data for the example user interface illustrated in FIG. 7 can be generated by the AR modeling system 100, and the example user interface can be rendered and displayed by the application 132 of the user device 130.

Once the property model 620 has been placed down on the surface, the result may be view 710 in FIG. 7 being presented to the user (e.g., through a display device, such as an augmented reality headset). The view 710 shows the property model 720 anchored down in place (e.g., where the user selected for placement) in their field of view and the user may be able to walk around the property model 720 (e.g., by walking around the anchored place in the location in which the user is present) to see all the different sides of the property model 720 and from different perspectives, without the property model 720 moving.

Figure 8:
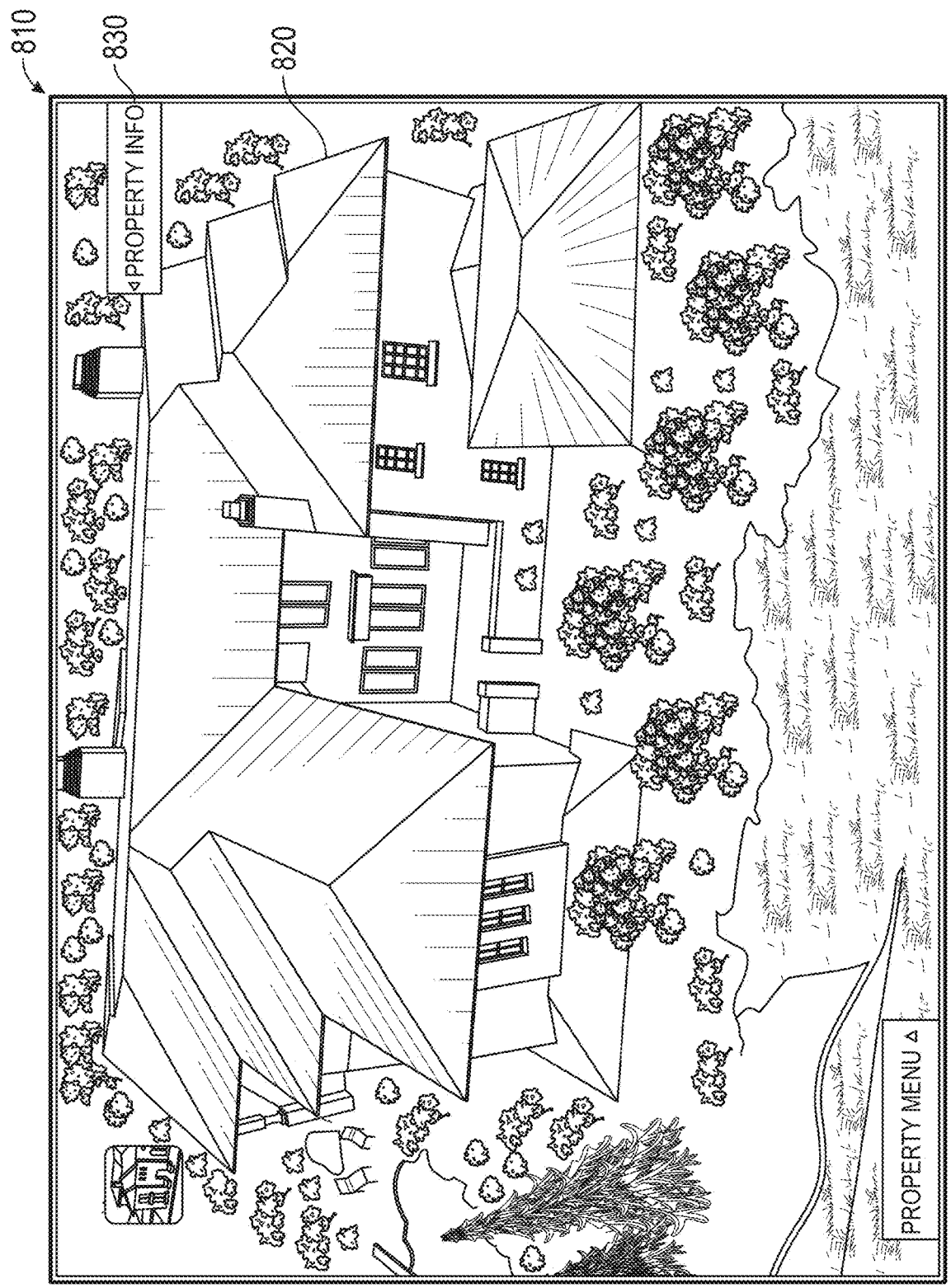

FIG. 8 illustrates an example user interface for presenting 3D building models, simulated risk, and contextual information, in accordance with embodiments of the present disclosure. Data for the example user interface illustrated in FIG. 8 can be generated by the AR modeling system 100, and the example user interface can be rendered and displayed by the application 132 of the user device 130.

Once the property model 720 has been anchored down in place within the real-world environment, the user may be free to move the display device "closer" to the virtual property model 720 (e.g., by walking towards the anchored location with the augmented reality headset on, moving a mobile device or iPad towards the anchored location, and so forth) and zoom in, and the result may be the view 810 in FIG. 8 being presented to the user (e.g., through a display device, such as an augmented reality headset).

The view 810 shows the property model 820 up close and zoomed in. Similarly to FIG. 7, the user may be able to walk around the property model 820 (e.g., by walking around the anchored place in the location in which the user is present) to see all the different sides of the property model 820 and from different perspectives, without the property model 820 moving. However, since the display device is now "closer" to the property model 820, it will remain up close and zoomed in to the user. The view 810 may also include a property info button 830 that, when selected, may cause contextual property information to be displayed on screen.

Figure 9:
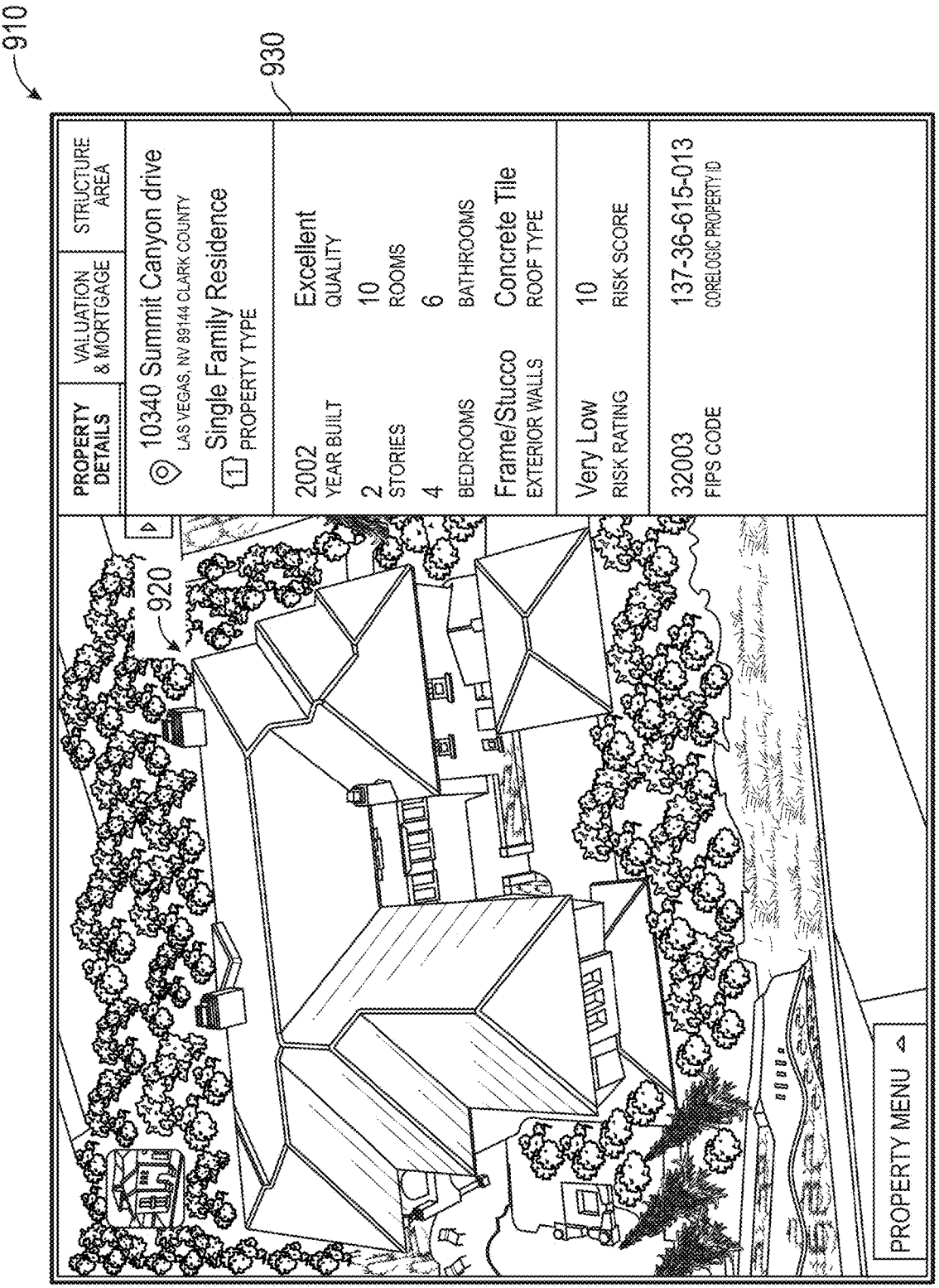

FIG. 9 illustrates an example user interface for presenting 3D building models, simulated risk, and contextual information, in accordance with embodiments of the present disclosure. Data for the example user interface illustrated in FIG. 9 can be generated by the AR modeling system 100, and the example user interface can be rendered and displayed by the application 132 of the user device 130.

Selecting the property info button 830 may result in contextual property information associated with the property to be displayed on the screen, such as in the manner shown in view 910 of FIG. 9. View 910 may include the property model 920 and an information overlay 930 that provides contextual property information associated with the property. For instance, in the example information overlay 930 that is shown in FIG. 9, there may be three different informational tabs ("Property Details", "Valuation & Mortgage", and "Structure Area"). The "Property Details" information tab may display the address associated with the property (e.g., "10340 Summit Canyon Drive, Las Vegas, Nev. 89144 Clark County"); the property type (e.g., "Single Family Residence"); the year the property was built (e.g., "2002"); the property quality (e.g., "Excellent"); the number of stories, rooms, bedrooms, and bathrooms; the material of the exterior walls (e.g., "Frame/Stucco"); the roof type (e.g., "Concrete Tile"); the risk rating ("Very Low"); the risk score ("10"); the FIPS code; and the property ID.

Figure 10:
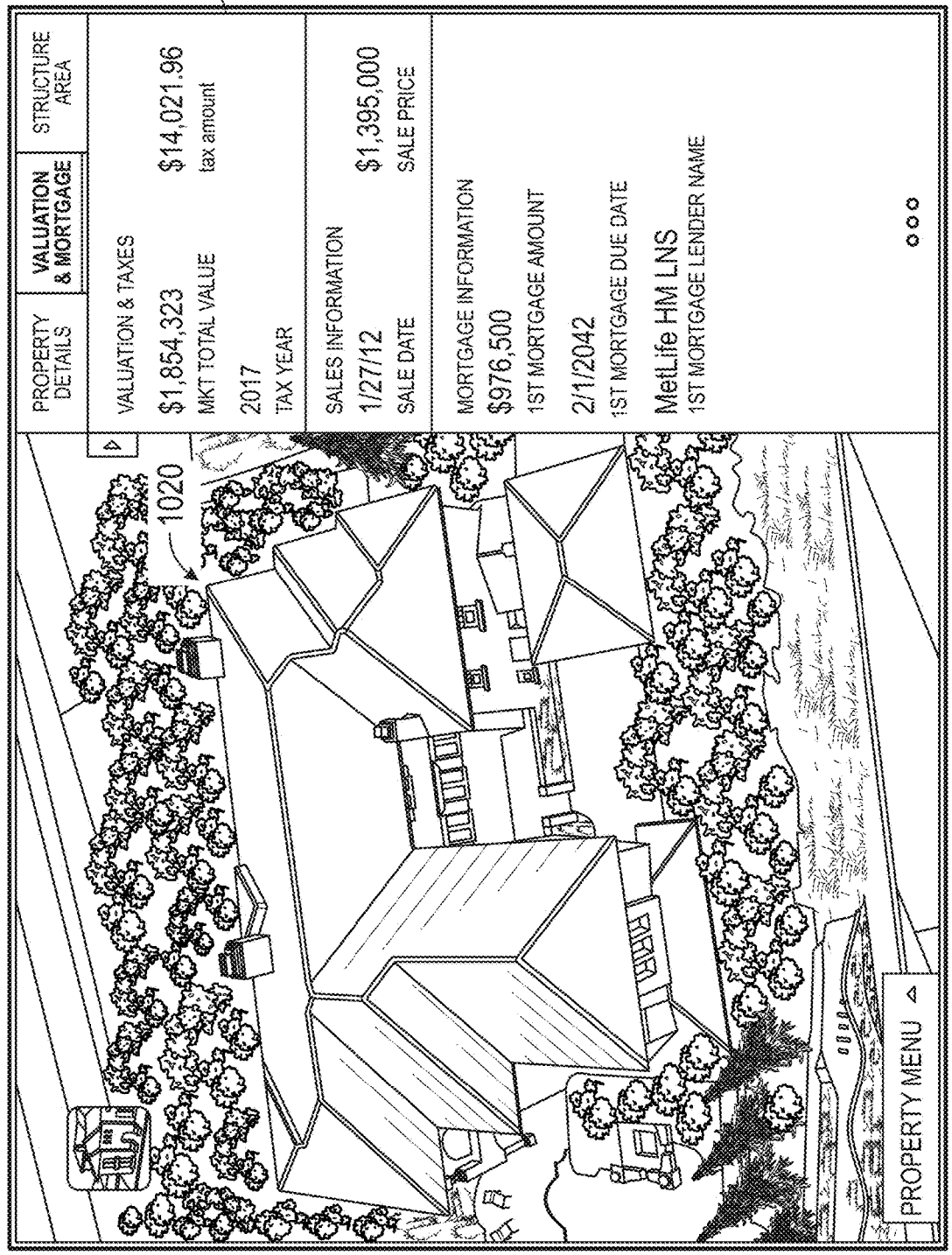

FIG. 10 illustrates an example user interface for presenting 3D building models, simulated risk, and contextual information, in accordance with embodiments of the present disclosure. Data for the example user interface illustrated in FIG. 10 can be generated by the AR modeling system 100, and the example user interface can be rendered and displayed by the application 132 of the user device 130.

Selecting the "Valuation & Mortgage" informational tab in the information overlay 930 may result in a different set of contextual property information to be presented, such as in the manner shown in the information overlay 1030 in the view 1010 of FIG. 10. View 1010 may include the property model 1020 and an information overlay 1030 that provides contextual property information associated with the property. For instance, in the example information overlay 1030 that is shown, with the "Valuation & Mortgage" information tab selected, the information overlay 1030 may display information such as the valuation of the property (e.g., "$1,854,323"); the taxes on the property (e.g., "$14,021.96") for a tax year (e.g., "2017"); sales information such as last sale date (e.g., "1/27/12") and the sale price (e.g., "$1,395,000"); and mortgage information such as first mortgage amount (e.g., "$976,500"), first mortgage due date (e.g., "2/1/2042"), and first mortgage lender name (e.g., "MetLife HM LNS").

Figure 11:
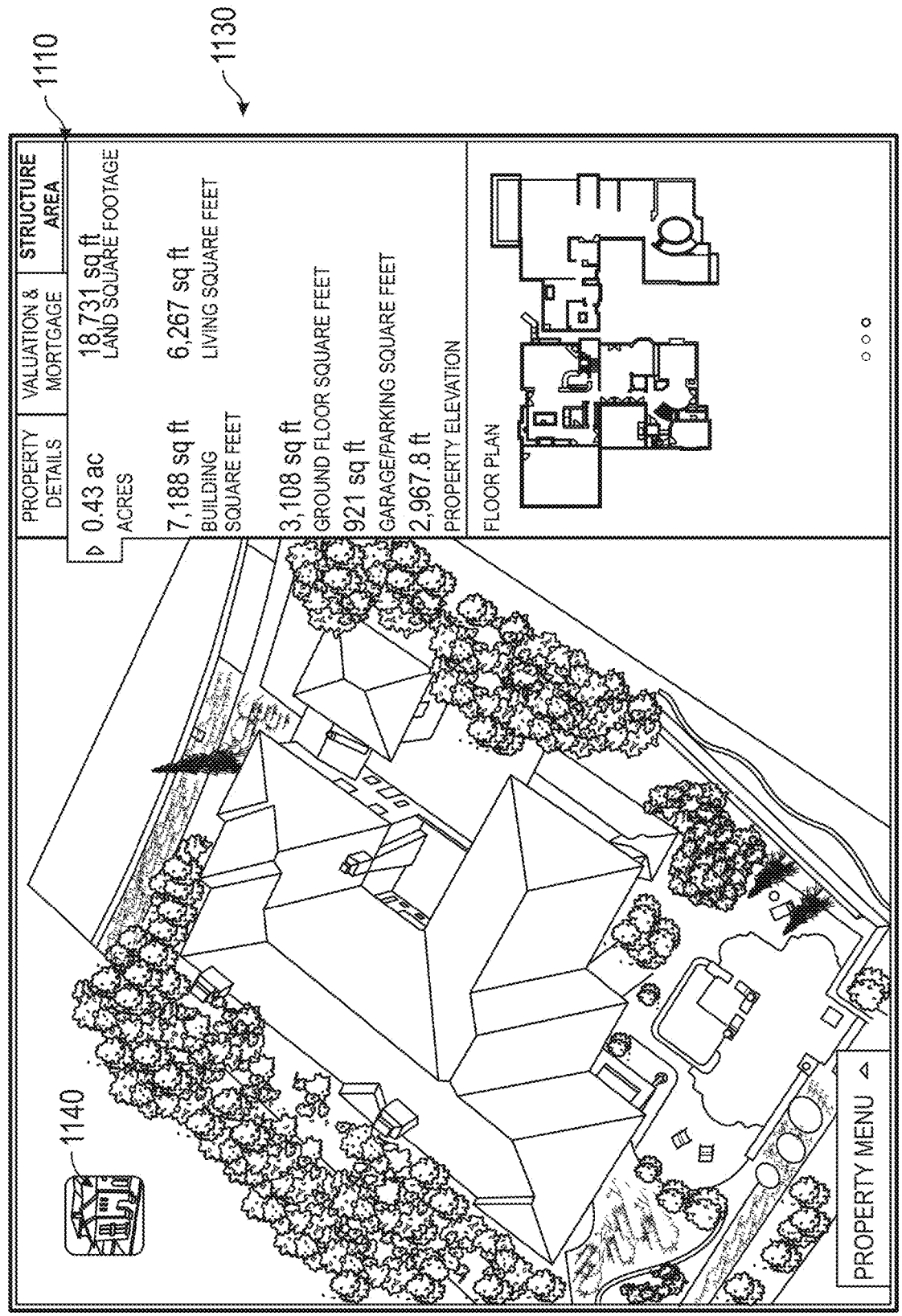

FIG. 11 illustrates an example user interface for presenting 3D building models, simulated risk, and contextual information, in accordance with embodiments of the present disclosure. Data for the example user interface illustrated in FIG. 11 can be generated by the AR modeling system 100, and the example user interface can be rendered and displayed by the application 132 of the user device 130.

Selecting the "Structure Area" informational tab in the information overlay 930 or the information overlay 1030 may result in a different set of contextual property information to be presented, such as in the manner shown in the information overlay 1130 in the view 1110 of FIG. 11. View 1110 may include the property model 1120 and an information overlay 1130 that provides contextual property information associated with the property. For instance, in the example information overlay 1130 that is shown, with the "Structure Area" information tab selected, the information overlay 1130 may display information such as the number of acres for the property (e.g., "0.43 ac"); the land square footage of the property (e.g., "18,731"); the building square footage of the property (e.g., "7,188"); the livable square footage of the property (e.g., "6,267"); the ground floor square footage of the property (e.g., "3,108"); the garage/parking square footage of the property (e.g., "921"); the property elevation (e.g., "2,967.8 ft"); and the floor plan for the property.

Figure 12:
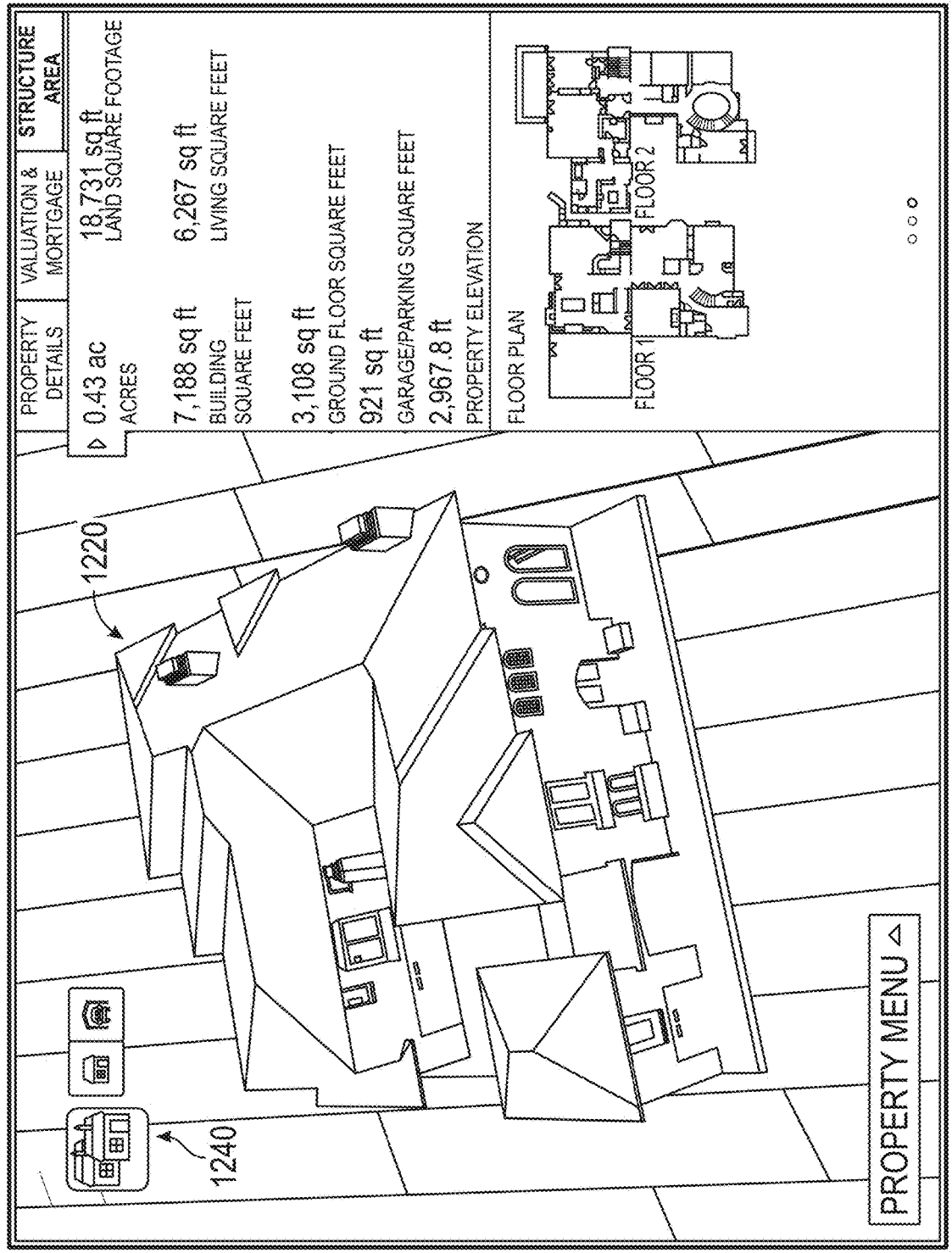

FIG. 12 illustrates an example user interface for presenting 3D building models, simulated risk, and contextual information, in accordance with embodiments of the present disclosure. Data for the example user interface illustrated in FIG. 12 can be generated by the AR modeling system 100, and the example user interface can be rendered and displayed by the application 132 of the user device 130.

In some of the example user interfaces shown, there may be a user interface element or view toggle that can be selected in order to bring up a dollhouse view of the property. For instance, the view toggle 1140 of FIG. 11 may be selected in order to change the presented view of the property to a dollhouse view of the property, such as the dollhouse view 1220 shown in FIG. 12.

The dollhouse view 1220 of the property may show a virtualized 3D model of the property in which individual layers of the 3D model can be removed or rendered transparent to see additional information and/or in which layers of the 3D model can be separated from other layers of the 3D model. For example, a roof layer of the 3D model can be removed or toggled off to show a more detailed 3D view of the top floor of the property. Similarly, one or more layers (e.g., a layer corresponding to an individual room or an individual floor in the property) of the 3D model can be separated from the other layers of the 3D model so that a user can interact solely with the separated layer(s). In some embodiments, there may be a user interface element or view toggle 1240 that can be selected in order to switch the view back as it was before.

Figure 13:
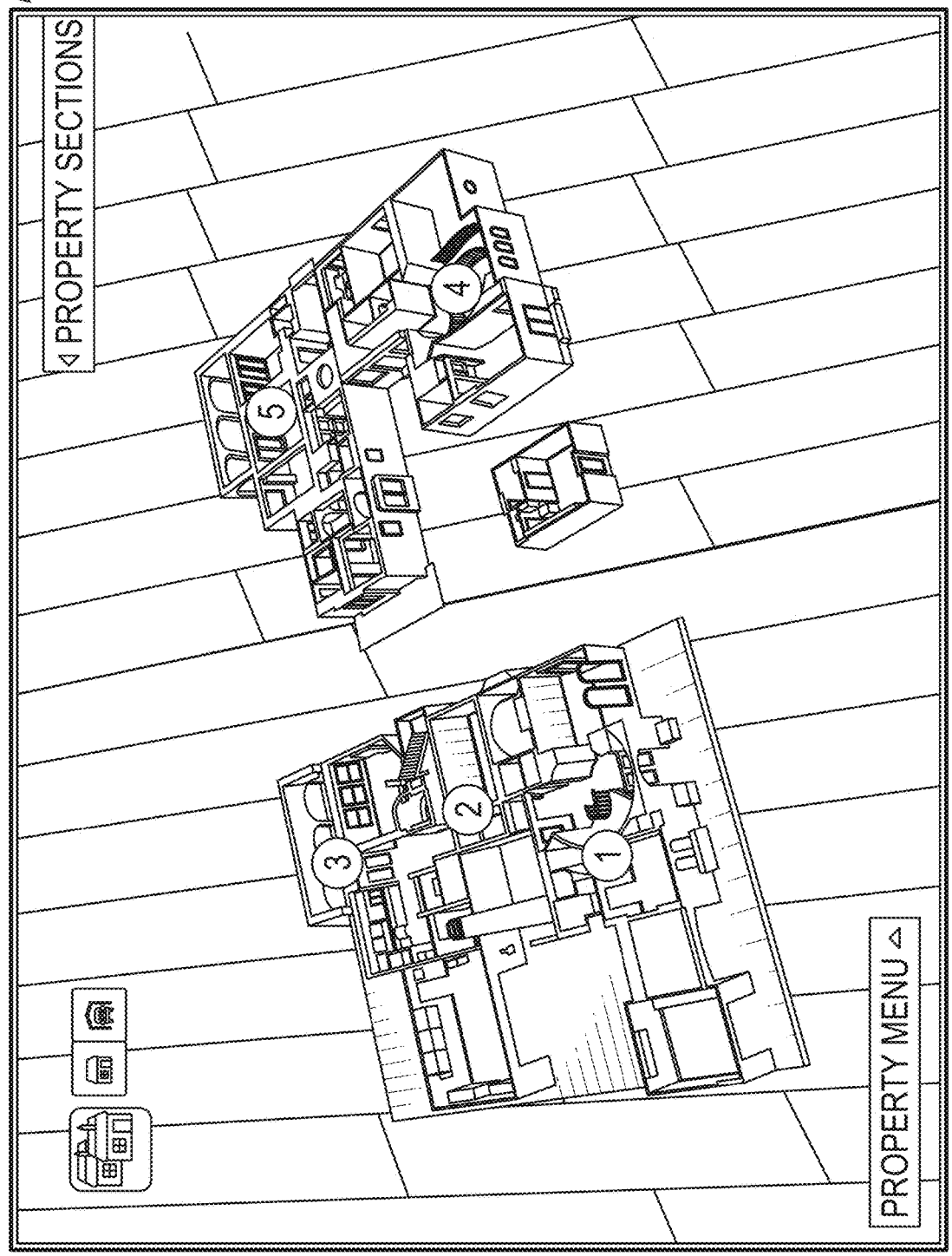
Figure 14:
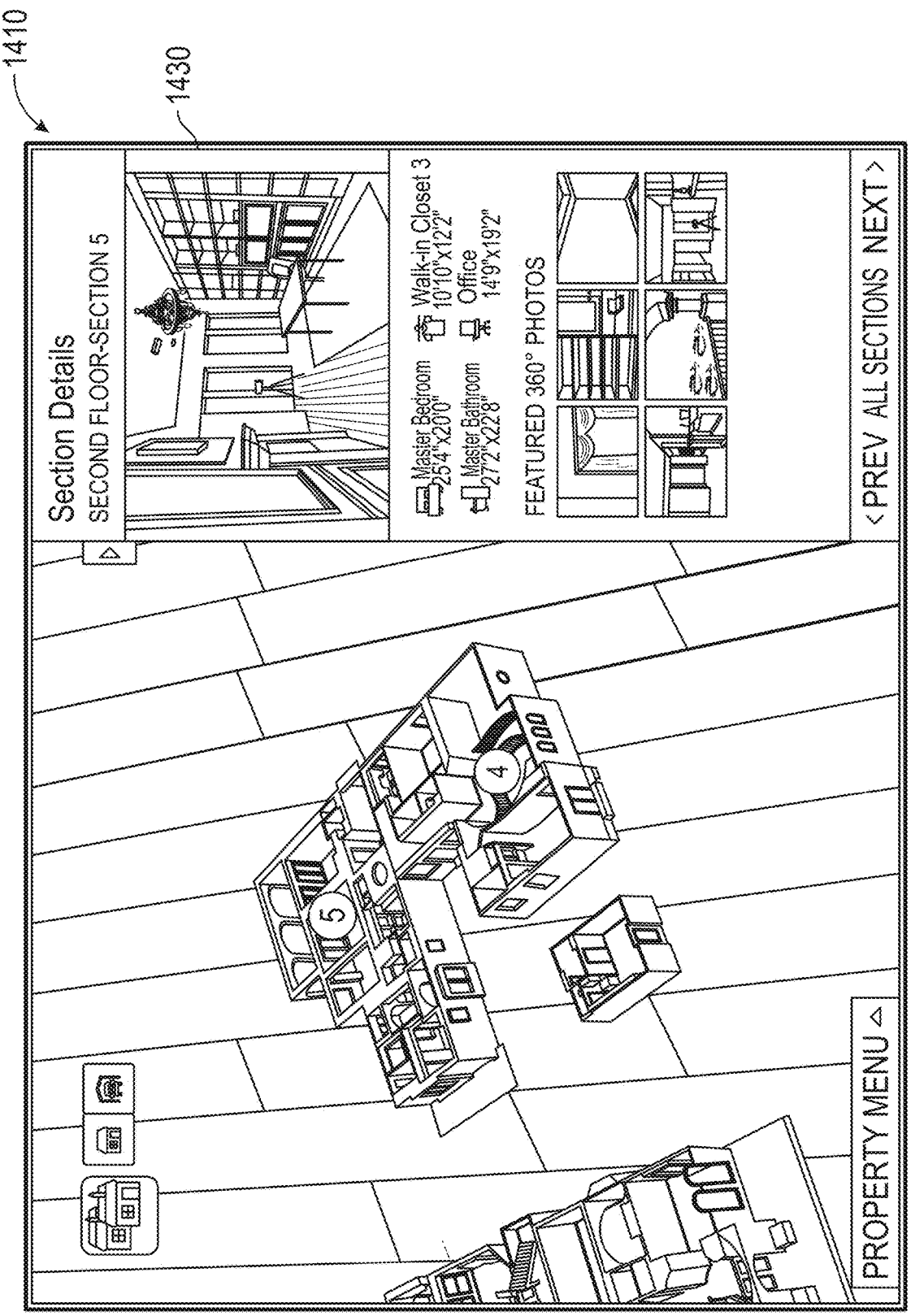
Figure 15:
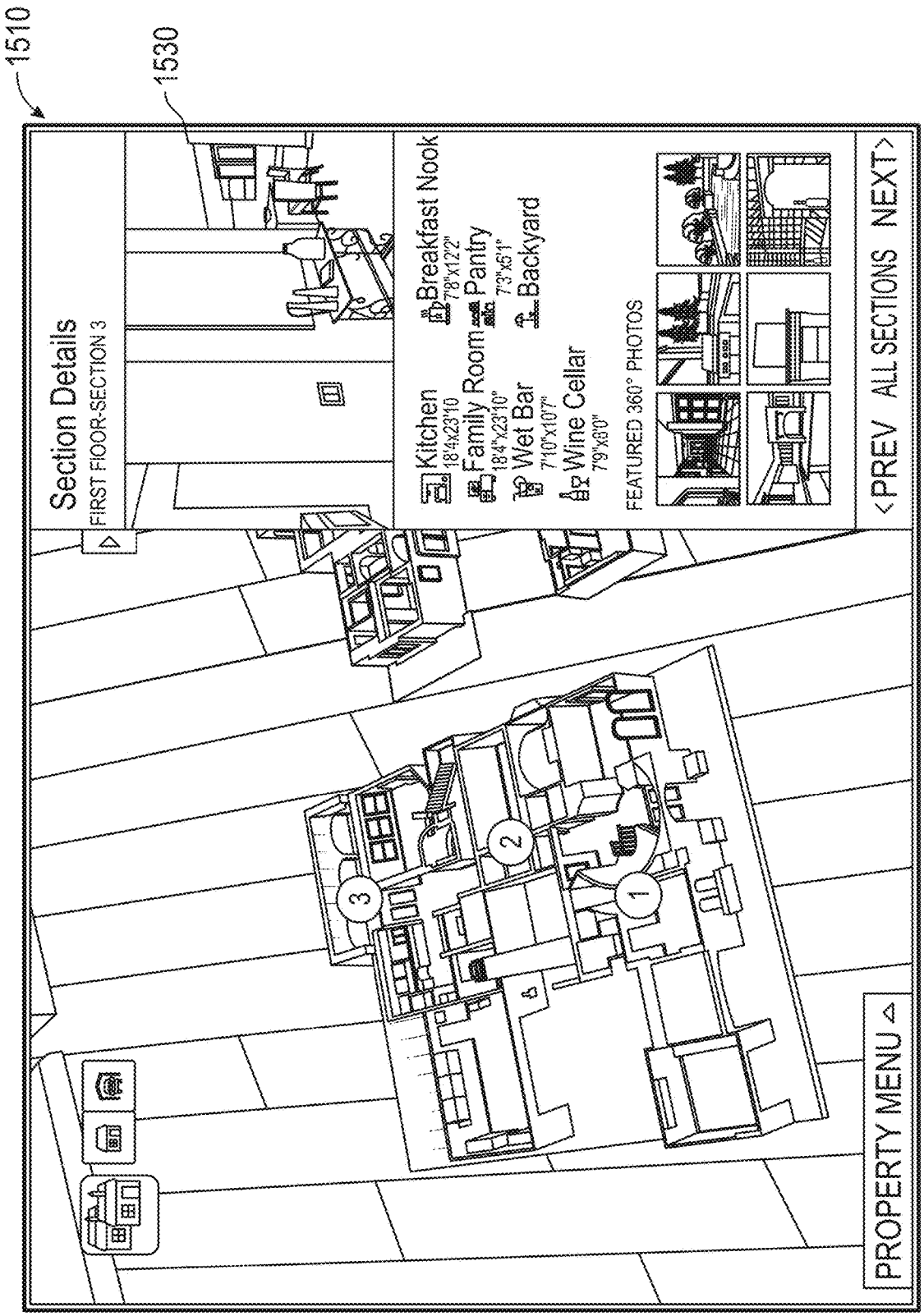

In some embodiments, there may be a feature to look at a view that splits the virtual 3D model of the property into sections of a 3D floor plan and/or into one or more 3D rooms. The different sections and/or rooms may be selected and individually viewed and/or manipulated by the user. FIGS. 13-15 show views in which the virtual 3D model of the property has been split up into sections. Data for the example views illustrated in FIGS. 13-15 can be generated by the AR modeling system 100, and the example views can be rendered and displayed by the application 132 of the user device 130.

For instance, FIG. 13 shows the view 1310 of a virtual 3D model of the property that has been split into different numbered sections (e.g., numbered 1-5). Selecting one of the sections may re-center the view on that particular section and enable a user to explore that particular section of the property.

Contextual information and photos (or videos) associated with a particular section of the property may be presented to the user, such as in the manner shown in the information overlay 1430 in the view 1410 of FIG. 14, which illustrates an example in which the selected section of the property is section 5 on the second floor. The information overlay 1430 that is shown in the example may display information such as the dimensions for the master bedroom (e.g., "25'4"× 20'""); the dimensions for the walk-in closet (e.g., "10'10"× 12'2'""); the dimensions for the master bathroom (e.g., "27'2"×22'8""); the dimensions for the office (e.g., "14'9"× 19'2""); and 360 degree photos that were captured for that section of the property.

FIG. 15 similarly shows the view 1510 of the virtual 3D model of the property that has been split into different numbered sections (e.g., numbered 1-5), except that the selected section of the property is section 3 on the first floor, resulting in the view 1510 being centered on the labeled section 3 of the model. The information overlay 1530 displays contextual information and photos associated with the selected section, which in this example includes information such as the dimensions for the kitchen (e.g., "18'4"× 23'10""); dimensions for the breakfast nook (e.g., "7'8"× 12'2""); dimensions for the family room (e.g., "18'4"× 23'10""); dimensions for the pantry (e.g., "7'3"×5'1""); dimensions for the wet bar (e.g., "7'10"×10'7""); dimensions for the wine cellar (e.g., "7'9"×8""); and 360 degree photos that were captured for that section of the property.

Figure 16:
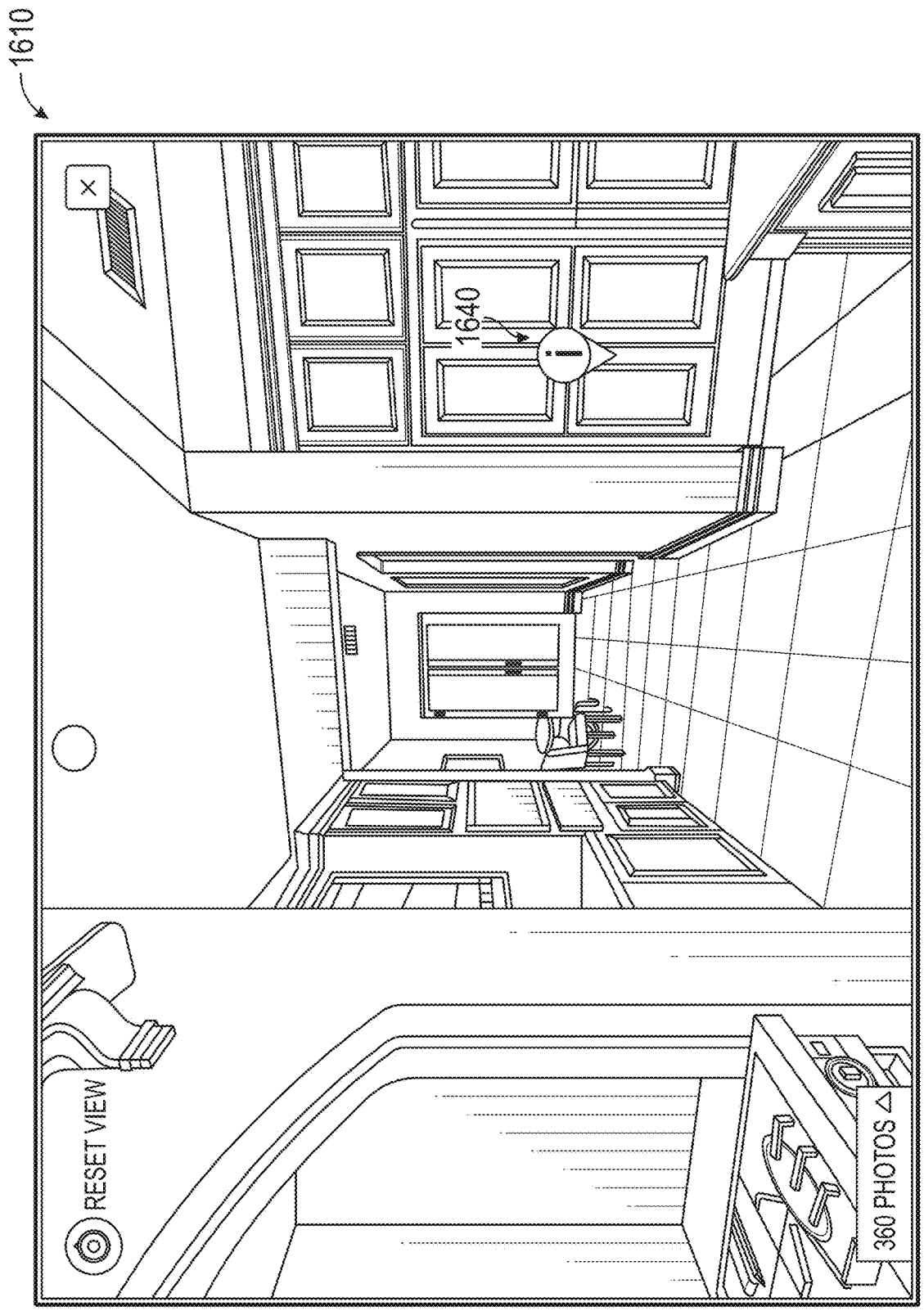
Figure 17:
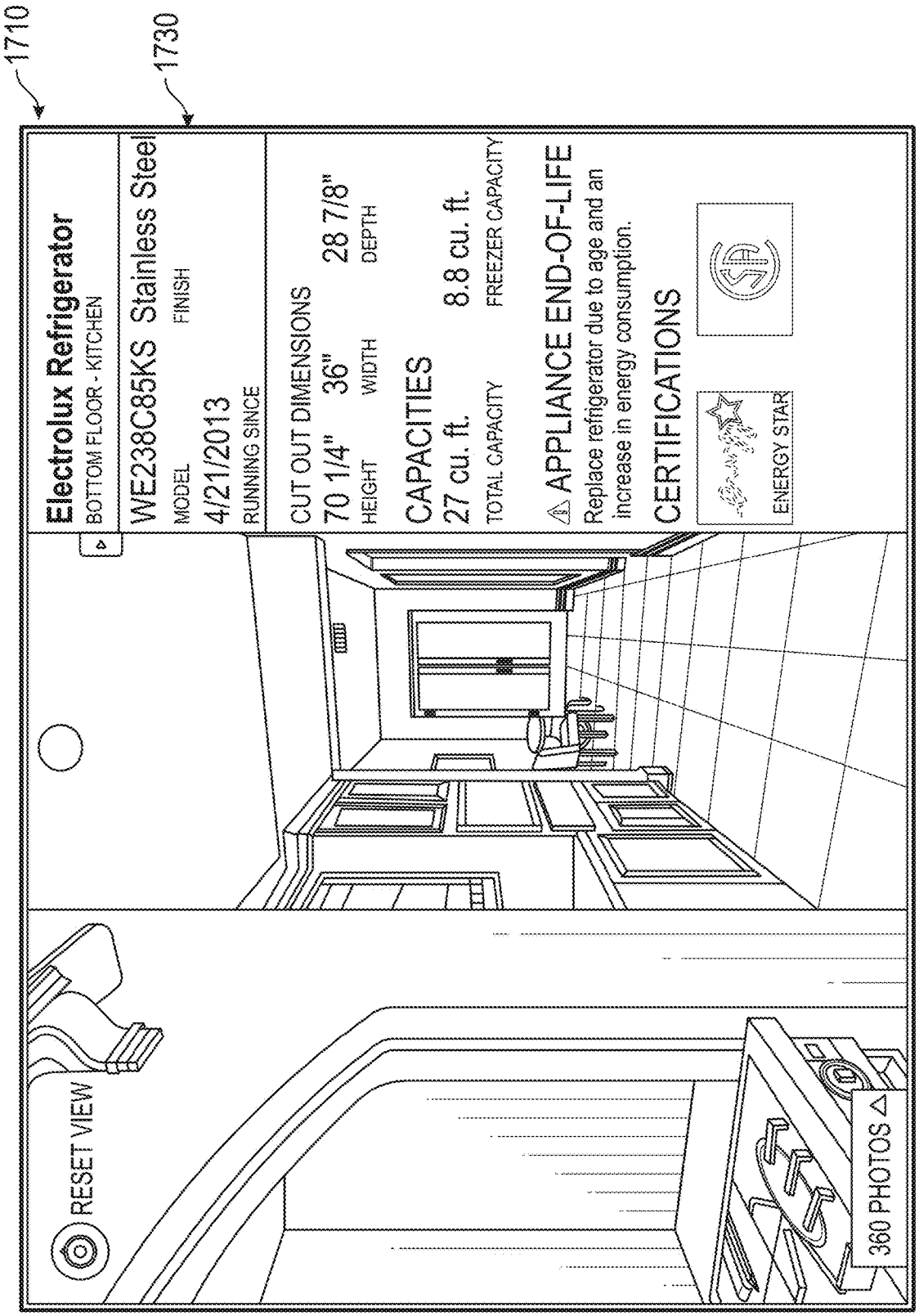

FIGS. 16 and 17 show example user interfaces displaying the 360 degree photos captured for the various section of the property. Data for the example user interfaces illustrated in FIGS. 16-17 can be generated by the AR modeling system 100, and the example user interfaces can be rendered and displayed by the application 132 of the user device 130.

For instance, selecting one of the thumbnails for the 360 degree photos in the information overlay 1430 or the information overlay 1530 may present that corresponding 360 degree photo in full-screen, such as in the manner shown in the view 1610 of FIG. 16. The view 1610 displaying the 360 degree photo may be adjusted to change the point-of-view (POV) of the camera (e.g., the perspective of the image), such as by the user moving around or rotating the display device (e.g., the augmented reality headset or mobile device). For instance, if the user is presented the view 1610 through an augmented reality headset, the user may be able to move their head around in order to adjust the point-of-view of the camera. There may be a button or option that the user can select in order to reset the viewpoint (e.g., to the initial, default POV).

Thus, a user may be able to move from section to section, or room to room, of the property and be able to see a fully-immersed, 360 degree view of that room in high-definition, allowing the user to take a virtual tour of the property. The interactivity of these 360 degree photos can be supplemented by providing additional contextual information about various features of interest in the property that the user may wish to know. For instance, if the user selects a kitchen countertop, product details associated with the kitchen countertop may be displayed (e.g., the countertop is granite and was purchased from X company for Y price). The overall interactivity and amount of information accessible to the user may depend on what an administrator (e.g., realtor, appraiser) wants the user to experience within that virtual environment. The display of this additional contextual information may be implemented such that various features of interest that do have associated contextual information are indicated visually in the display. For example, there may be a halo or highlight around a refrigerator to inform the user that there is additional information associated with the refrigerator that can be made available to the user if the user selects the refrigerator.

For instance, in some cases, the view 1610 of the 360 degree photo may show an indicator or icon (such as indicator 1640) associated with features of interest shown in the photo. If the user selects the indicator for a feature of interest, an information overlay may be displayed to show contextual information associated with that particular feature of interest. For example, in view 1610, the indicator 1640 is associated with a refrigerator in the kitchen. Selecting the indicator 1640 in this example may result in the display of information overlay 1730 in view 1710 of FIG. 17.

The information overlay 1730 may provide contextual information associated with the associated feature of interest. For instance, the information overlay 1730 shows that the feature of interest is an "Electrolux Refrigerator" and lists additional information, such as the model ID (e.g., "WE238C85KS"); the finish (e.g., "Stainless Steel"); the date the refrigerator has been running since (e.g., "4/21/2013"); the dimensions including the height (e.g., "70¼ inches"), width (e.g., "36 inches"), and depth (e.g., "28⅞ inches"); the capacities including the total capacity (e.g., "27 cu. Ft.") and the freezer capacity (e.g., "8.8 cu. Ft."); and any notices or certifications associated with the refrigerator.

Example Hardware Configuration of Computing System

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 18:
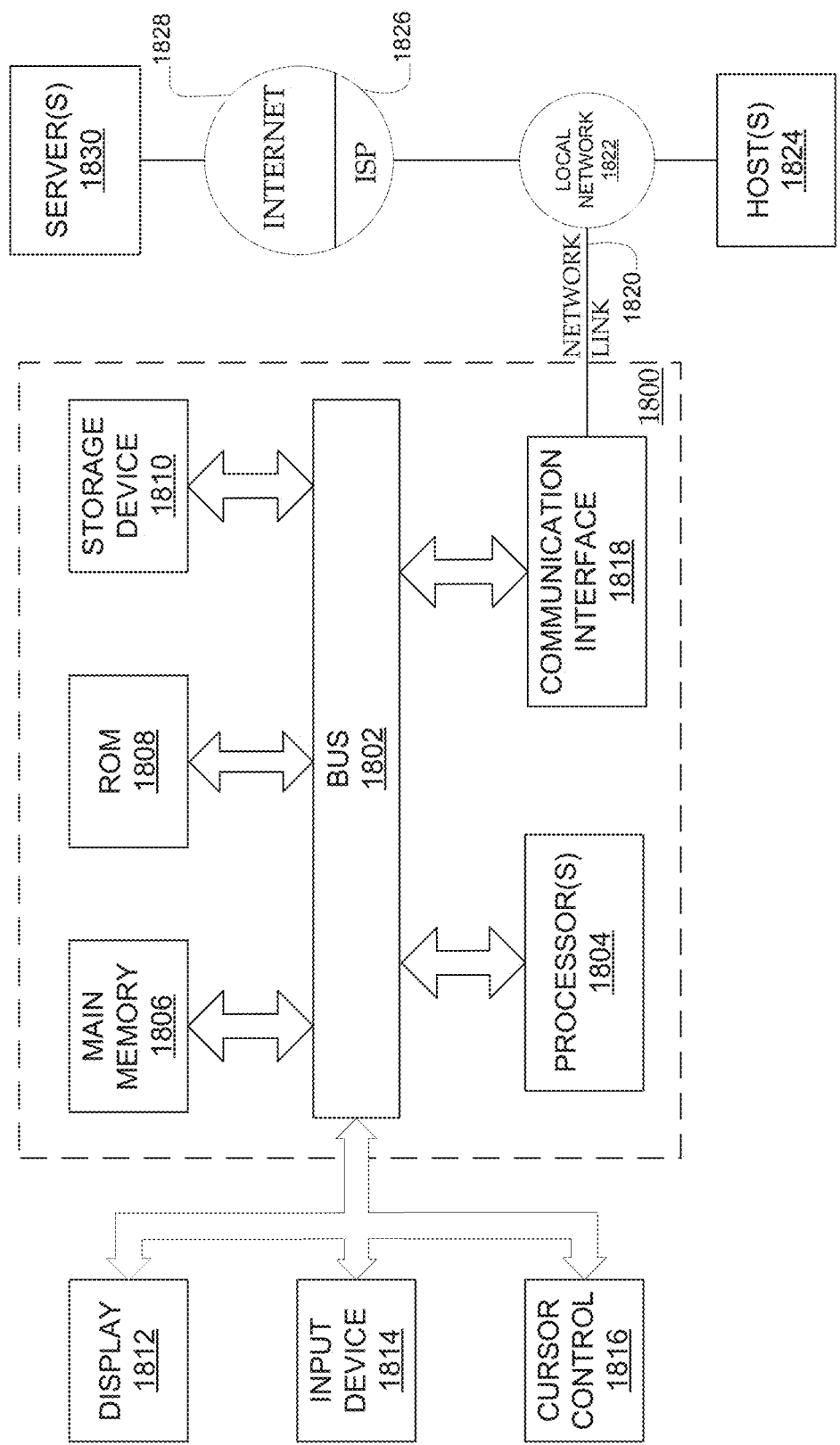
FIG. 18 illustrates an embodiment of a hardware configuration for a computing system usable to implement embodiments of the AR modeling described herein.

For example, FIG. 18 is a block diagram that illustrates a computer system 1800 upon which various embodiments may be implemented. Computer system 1800 includes a bus 1802 or other communication mechanism for communicating information, and a hardware processor, or multiple processors, 1804 coupled with bus 1802 for processing information. Hardware processor(s) 1804 may be, for example, one or more general purpose microprocessors.

Computer system 1800 also includes a main memory 1806, such as a random access memory (RAM), cache and/or other dynamic storage devices, coupled to bus 1802 for storing information and instructions to be executed by processor 1804. Main memory 1806 also may be used for storing temporary variables or other intermediate information during execution of instructions to be executed by processor 1804. Such instructions, when stored in storage media accessible to processor 1804, render computer system 1800 into a special-purpose machine that is customized to perform the operations specified in the instructions.

Computer system 1800 further includes a read only memory (ROM) 1808 or other static storage device coupled to bus 1802 for storing static information and instructions for processor 1804. A storage device 1810, such as a magnetic disk, optical disk, or USB thumb drive (Flash drive), etc., is provided and coupled to bus 1802 for storing information and instructions.

Computer system 1800 may be coupled via bus 1802 to a display 1812, such as a cathode ray tube (CRT) or LCD display (or touch screen), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1800 may include a user interface module to implement a GUI that may be stored in a mass storage device as computer executable program instructions that are executed by the computing device(s). Computer system 1800 may further, as described below, implement the techniques described herein using customized hard-wired logic, one or more ASICs or FPGAs, firmware and/or program logic which in combination with the computer system causes or programs computer system 1800 to be a special-purpose machine. According to one embodiment, the techniques herein are performed by computer system 1800 in response to processor(s) 1804 executing one or more sequences of one or more computer readable program instructions contained in main memory 1806. Such instructions may be read into main memory 1806 from another storage medium, such as storage device 1810. Execution of the sequences of instructions contained in main memory 1806 causes processor(s) 1804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1804 for execution. For example, the instructions may initially be carried on a magnetic disk or solid state drive of a remote computer. The remote computer can load the instructions into its dynamic memory and send the instructions over a telephone line using a modem. A modem local to computer system 1800 can receive the data on the telephone line and use an infra-red transmitter to convert the data to an infra-red signal. An infra-red detector can receive the data carried in the infra-red signal and appropriate circuitry can place the data on bus 1802. Bus 1802 carries the data to main memory 1806, from which processor 1804 retrieves and executes the instructions. The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be an integrated services digital network (ISDN) card, cable modem, satellite modem, or a modem to provide a data communication connection to a corresponding type of telephone line. As another example, communication interface 1818 may be a local area network (LAN) card to provide a data communication connection to a compatible LAN (or WAN component to communicated with a WAN). Wireless links may also be implemented. In any such implementation, communication interface 1818 sends and receives electrical, electromagnetic or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the world wide packet data communication network now commonly referred to as the "Internet" 1828. Local network 1822 and Internet 1828 both use electrical, electromagnetic or optical signals that carry digital data streams. The signals through the various networks and the signals on network link 1820 and through communication interface 1818, which carry the digital data to and from computer system 1800, are example forms of transmission media.

Computer system 1800 can send messages and receive data, including program code, through the network(s), network link 1820 and communication interface 1818. In the Internet example, a server 1830 might transmit a requested code for an application program through Internet 1828, ISP 1826, local network 1822 and communication interface 1818.

The received code may be executed by processor 1804 as it is received, and/or stored in storage device 1810, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method comprising:
as implemented by an augmented reality (AR) modeling system comprising one or more hardware processors,
obtaining a three-dimensional (3D) model of a building, wherein the 3D model of the building comprises a plurality of points in 3D space that are connected by one or more shapes to represent the building;
obtaining a 3D digital elevation model associated with the building;
determining an environmental risk factor associated with the building based on a geographic location of the building;
predicting damage to the building caused by the environmental risk factor using the 3D digital elevation model, one or more characteristics of a construction of the building, and one or more characteristics of the environmental risk factor;
modifying at least one of the plurality of points of the 3D model of the building based on the predicted damage to form a modified version of the 3D model of the building that provides a visual indication of the predicted damage to the building; and
causing display, in an AR view, of the modified version of the 3D model of the building.

2. The method of claim 1, wherein the 3D digital elevation model indicates position and elevation of points of interest surrounding the building.

3. The method of claim 1, wherein the 3D digital elevation model is generated using data captured by a drone.

4. The method of claim 1, wherein the environmental risk factor is one of: a flood, a flash flood, storm surge, hail, a hurricane, an earthquake, a wildfire, a volcanic eruption, or erosion.

5. The method of claim 1, further comprising:
obtaining contextual information associated with one or more features of the building; and
causing display of the contextual information with the displayed modified version of the 3D model of the building.

6. The method of claim 1, further comprising:
obtaining an image captured of an interior of the building; and
causing display of the image with the displayed modified version of the 3D model of the building.

7. The method of claim 6, wherein the image is a 360 degree image.

8. The method of claim 1, wherein the displayed modified version of the 3D model rotates as a user moves a device displaying the 3D model of the building around an anchor location of the 3D model of the building in a real-world location in which the user is present.

9. The method of claim 1, wherein selection of a user interface element in the AR view causes the displayed modified version of the 3D model of the building to transition into a dollhouse view of the building in which individual layers of the modified version of the 3D model of the building can be removed or split from other layers of the modified version of the 3D model of the building.

10. The method of claim 9, wherein, after selection of the user interface element, a first layer of the modified version of the 3D model of the building split from the other layers of the modified version of the 3D model of the building can be manipulated by a user within the AR view separately from the other layers of the modified version of the 3D model of the building.

11. The method of claim 1, further causing display, in the AR view, of a visual indicator corresponding to the modified version of the 3D model of the building that indicates the predicted damage.

12. The method of claim 1, further comprising causing display, in the AR view, of a second 3D model representing a simulation of the environmental risk factor.

13. The method of claim 1, wherein the modified version of the 3D model of the building is displayed using an AR device or mobile device.

14. Non-transitory computer storage media storing instructions that when executed by one or more hardware processors of an augmented reality (AR) modeling system, cause the AR modeling system to perform operations comprising:

obtaining a three-dimensional (3D) model of a building, wherein the 3D model of the building comprises a plurality of points in 3D space that are connected by one or more shapes to represent the building;

obtaining a 3D digital elevation model associated with the building;

determining an environmental risk factor associated with the building based on a geographic location of the building;

predicting damage to the building caused by the environmental risk factor using the 3D digital elevation model, one or more characteristics of a construction of the building, and one or more characteristics of the environmental risk factor;

modifying at least one of the plurality of points of the 3D model of the building based on the predicted damage to form a modified version of the 3D model of the building that provides a visual indication of the predicted damage to the building; and causing display, in an AR view, of the modified version of the 3D model of the building.

15. The non-transitory computer storage media of claim 14, wherein the 3D digital elevation model indicates position and elevation of points of interest surrounding the building.

16. The non-transitory computer storage media of claim 14, wherein the environmental risk factor is one of: a flood, a flash flood, storm surge, hail, a hurricane, an earthquake, a wildfire, a volcanic eruption, or erosion.

17. The non-transitory computer storage media of claim 14, wherein the displayed modified version of the 3D model of the building rotates as a user moves a device displaying the modified version of the 3D model of the building around an anchor location of the modified version of the 3D model of the building in a real-world location in which the user is present.

18. An augmented reality (AR) modeling system comprising:

computer storage media storing instructions; and one or more hardware processors configured to execute the instructions, wherein the instructions, when executed, cause the one or more hardware processors to perform operations comprising:

obtaining a three-dimensional (3D) model of a building, wherein the 3D model of the building comprises a plurality of points in 3D space that are connected by one or more shapes to represent the building;

obtaining a 3D digital elevation model associated with the building;

determining an environmental risk factor associated with the building based on a geographic location of the building;

predicting damage to the building caused by the environmental risk factor using the 3D digital elevation model, one or more characteristics of a construction of the building, and one or more characteristics of the environmental risk factor;

modifying at least one of the plurality of points of the 3D model of the building based on the predicted damage to form a modified version of the 3D model of the building that provides a visual indication of the predicted damage to the building; and causing display, in an AR view, of the modified version of the 3D model of the building.

19. The AR modeling system of claim 18, wherein the displayed modified version of the 3D model of the building rotates as a user moves a device displaying the modified version of the 3D model of the building around an anchor location of the modified version of the 3D model of the building in a real-world location in which the user is present.

* * * * *